(12) United States Patent
Srinivas et al.

(10) Patent No.: US 10,899,973 B1
(45) Date of Patent: *Jan. 26, 2021

(54) PROCESS FOR GENERATING HIGH PURITY SYNTHESIS GAS HYDROGEN FROM HEAVY OIL OR HYDROCARBONS

(71) Applicant: TDA Research, Inc., Wheat Ridge, CO (US)

(72) Inventors: Girish Srinivas, Broomfield, CO (US); Steven Charles Gebhard, Golden, CO (US); Robert James Copeland, Metairie, LA (US); Steve Schwab, Denver, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/292,096

(22) Filed: Mar. 4, 2019

Related U.S. Application Data

(63) Continuation-in-part of application No. 14/698,541, filed on Apr. 28, 2015, now Pat. No. 10,266,405.

(Continued)

(51) Int. Cl.
*C10G 35/06* (2006.01)
*C10G 35/14* (2006.01)
(Continued)

(52) U.S. Cl.
CPC ............ *C10G 35/06* (2013.01); *B01J 8/1863* (2013.01); *B01J 23/755* (2013.01); *B01J 38/12* (2013.01);
(Continued)

(58) Field of Classification Search
CPC .............. C01B 2203/1082; C01B 3/56; C01B 2203/0455; C01B 2203/043; C01B 3/50; C01B 2203/1058; C01B 2203/0485; C01B 2203/0233; C01B 3/40; C01B 2203/1047; Y02P 20/152; C10J 2300/165; C10J 3/00; C10J 3/82; B01J 20/06; B01J 20/0244; B01J 20/3458; B01J 8/26; B01J 21/04; B01J 23/78; B01J 23/8946; B01J 21/16; B01J 23/58; B01J 21/12; B01J 35/023; B01J 20/041; B01J 20/0225; B01J 20/0229; B01J 20/0237; B01J 20/0207; B01J 37/0223; B01J 23/42; B01J 23/83; B01J 35/1009; B01J 23/755; B01J 37/0215; B01D 53/485; B01D 2255/206;
(Continued)

(56) References Cited

U.S. PATENT DOCUMENTS

| 4,432,863 A * | 2/1984 | Myers | C01B 3/38 208/108 |
|---|---|---|---|
| 10,266,405 B1 * | 4/2019 | Srinivas | B01J 38/02 |
| 2007/0124997 A1 * | 6/2007 | Liu | B01J 8/0055 48/198.7 |

* cited by examiner

*Primary Examiner* — Anthony J Zimmer
*Assistant Examiner* — Syed T Iqbal
(74) *Attorney, Agent, or Firm* — Brian J. Elliott

(57) ABSTRACT

The present invention provides a steam reforming process for heavy oil or hydrocarbons using a circulating fluidized bed reactor, the process having a reforming step and a regeneration step, wherein the reforming step and the regeneration step comprise a fluidized reactor containing a fluidizable nickel-containing reforming catalyst and produce hydrogen as a product of the reforming bed. The invention produces high purity hydrogen in the synthesis gas product stream and avoids irreversible fouling on the catalyst.

18 Claims, 27 Drawing Sheets

Related U.S. Application Data

(60) Provisional application No. 61/985,279, filed on Apr. 28, 2014.

(51) Int. Cl.
 *B01J 23/755* (2006.01)
 *B01J 38/12* (2006.01)
 *B01J 8/18* (2006.01)
 *C01B 3/40* (2006.01)

(52) U.S. Cl.
 CPC ............... *C01B 3/40* (2013.01); *C10G 35/14* (2013.01); *C10G 2300/1044* (2013.01); *C10G 2300/4006* (2013.01); *C10G 2300/4012* (2013.01); *C10G 2300/4018* (2013.01); *C10G 2300/706* (2013.01); *C10G 2300/708* (2013.01); *C10G 2400/30* (2013.01)

(58) Field of Classification Search
 CPC .... B01D 2259/40086; B01D 2257/304; B01D 2257/504; B01D 53/12; B01D 53/08; B01D 2257/308; B01D 53/526; B01D 2255/20761; B01D 2255/2073; B01D 2253/112; B01D 2255/20753; B01D 2255/20746; B01D 2251/402; B01D 2255/20738; C10K 1/026; C10K 1/004; Y02C 10/08; Y02E 20/18; Y02E 20/16
 See application file for complete search history.

PROCESS FOR GENERATING HIGH PURITY SYNTHESIS GAS HYDROGEN FROM HEAVY OIL OR HYDROCARBONS

CROSS REFERENCE TO RELATED APPLICATIONS

This U.S. patent application is a Continuation-In-Part of non-provisional application Ser. No. 14/698,541 filed Apr. 28, 2015 (titled PROCESS FOR GENERATING HYDROGEN FROM HEAVY OIL OR HYDROCABONS, by Girish Srinivas, Steven Charles Gebhard and Robert James Copland, and the present application also claims the benefit of the provisional application No. 61/985,279 filed Apr. 28, 2014 (titled PROCESS FOR GENERATING HYDROGEN FROM HEAVY OIL OR HYDROCABONS, by Girish Srinivas, Steven Charles Gebhard and Robert James Copland), both of which are incorporated by reference herein. Provisional application No. 61/985,279 and non-provisional application Ser. No. 14/698,541 are not admitted to be prior art with respect to the present invention by its mention in the background or cross reference section.

STATEMENT REGARDING FEDERALLY SPONSORED RESEARCH OR DEVELOPMENT

This invention was made using U.S. government funding through the U.S. Department of Energy contract No. DE-FG02-08ER85135. The government has certain rights in this invention.

BACKGROUND

Refineries in the U.S. are processing increasingly heavy sour crudes that contain metals, sulfur, and high molecular weight aromatic hydrocarbons. Many sour crudes originate in the Western Hemisphere, including heavy crudes from Venezuela, Southern California, and the enormous quantities of oil sands in Canada. Processing and upgrading these heavy feedstocks requires considerable hydrogen. Since revamping or installing new hydrogen capacity with conventional technologies such as steam methane reforming, or petroleum coke gasification, are usually expensive, developing a process that can generate hydrogen from "bottom of the barrel" products presents an economically attractive alternative.

Currently, refiners make at least part of the hydrogen they use by steam-reforming methane or coke gasification. Naphtha is the heaviest feed that can economically be processed by conventional steam-reforming, and existing methods suffer from the limitation that heavy oils are not suitable as the feedstock.

Furthermore, hydrogen usage by petroleum refiners has been increasing. Approximately half of the petroleum refined in the United States is imported, and approximately half of that can be classified as heavy crude that contains high concentrations of sulfur, metals and high molecular weight hydrocarbons. Sulfur, metals and other contaminants are removed by hydrotreating, and high molecular weight hydrocarbons can be converted into lower molecular weight fractions by hydroprocessing. Very high molecular weight components such as asphaltenes are usually processed by coking. The reduction in allowable aromatic hydrocarbons and sulfur in gasoline and diesel, along with the need to process heavier crude oils, has increased the demand for hydrogen in the refinery.

The main commercial processes for the on-purpose production of hydrogen are steam reforming (natural gas or naphtha), partial oxidation (coal, coke, resid), or electrolysis of water. [Kirk-Othmer Encyclopedia of Chemical Technology, in Hydrogen by William F. Baade, Uday N. Parekh, Venkat S. Raman, Dec. 20, 2001, John Wiley & Sons.] Hydrogen is also commercially produced as a by-product of chemical processes (ethylene crackers, styrene, MTBE etc.) or gasoline manufacturing (catalytic reforming). Conventional steam reforming is a method for hydrogen production from hydrocarbon fuels such as natural gas. This is achieved in a processing device called a reformer which reacts steam at high temperature with the hydrocarbon fuel.

Scheme 1: methane steam reforming $$CH_4 + 2H_2O \rightarrow CO_2 + 4H_2$$

Heavy oil (for example resid) and solids (coal) are used in oxidation or gasification processes to make hydrogen.

Scheme 2: resid partial oxidation and coal gasification resid partial oxidation: $CH_{1.8} + 0.98H_2O + 0.51O_2 \rightarrow CO_2 + 1.88H_2$ coal gasification: $CH_{0.8} + 0.6H_2O + 0.7O_2 \rightarrow CO_2 + H_2$ Selection of the differing processes is dependent on a number of criteria: (1) the availability and relative cost of the different feedstocks; (2) capital costs; (3) operating costs; (4) environmental considerations, and (5) end use of the hydrogen or syngas. Generally, as the feedstocks go from natural gas to light hydrocarbons to heavy hydrocarbons and then to solid feedstocks, the processing difficulty and capital costs increase. Partial oxidation (PDX) plants also require an air separation plant to produce the oxygen, larger water gas shift and $CO_2$ removal facilities and gas cleanup systems due to impurities present in the solid feedstocks (such as sulfur) (Kirk-Othmer, 2001).

Heavier fractions, such as vacuum residue, deasphalter bottoms, refinery sludges, and petroleum coke, can be processed into hydrogen using PDX technology, however, the low hydrogen content of these feeds combined with a high capital and operating cost requires that they be available at very low or negative cost for a hydrogen only facility (Kirk-Othmer, 2001).

In the U.S., over 95% of on-purpose hydrogen production is supplied by steam methane reforming of light hydrocarbons. Many existing refinery and chemical hydrogen plants produce a medium-purity (95%-97%) hydrogen product by removing the carbon dioxide in an absorption system and methanating any remaining carbon oxides. Since the 1980s most SMRs use pressure swing adsorption (PSA) technology to recover and purify the hydrogen to purities above 99.9% (Kirk-Othmer, 2001).

When natural gas is used as the feed to a steam reformer, the basic reactions are (1) reforming and (2) shift.

Scheme 3:

$CH_4 + H_2O \rightarrow \leftarrow CO + 3H_2$ Endothermic $\Delta H° 25°$ C.=206 KJ/gmol (49.3 kcal/gmol)  (Reforming)

$CO + H_2O \rightarrow \leftarrow CO_2 + H_2$ Exothermic $\Delta H° 25°$ C.=−41 KJ/gmol (−9.8 kcal/gmol)  (Shift)

The reforming reaction is highly endothermic and accompanied by an increase in the total number of moles. Hence, it is favored by high temperature and low pressure. For light hydrocarbon feeds such as natural gas, a single nickel-based catalyst is employed. However, for heavier feeds such as naphtha, two catalysts are usually preferred (Kirk-Othmer, 2001). The reforming reaction is equilibrium-limited. It is favored by high temperature 788-880° C., low pressure (1.4-3.8 MPa), and a high steam-to-carbon ratio (2.5 to 4). These conditions minimize methane slip at the reformed outlet and yield an equilibrium mixture that is rich in hydrogen. The shift reaction is exothermic and independent of pressure. It is also equilibrium limited and favored by low temperature (343-371° C.) and high steam concentration. Normally, the shift catalyst is based on iron oxide.

It is clear that a steam reformer has the capability to also produce carbon dioxide ($CO_2$), carbon monoxide (CO) and synthesis gas ($CO+H_2$), which are valuable coproducts in some geographic areas. Also owing to the high temperatures, varying amounts of steam must be generated by heat recovery from the reformer furnace. This steam can be exported to the refinery or petrochemical facility for process needs and/or converted into electricity. By-products such as carbon dioxide, steam, and electricity have a large impact on plant design and economics. In addition, other utilities such as boiler feed water, cooling water, instrument air, and nitrogen are required to support operation of a hydrogen plant. Hence the needs can be combined with those of the host site to further reduce the total system supply costs.

Heavy oil is produced in the refining of petroleum and can come from other sources including but not limited to the mining and extraction of oil sands. Examples of fossil sources of heavy oil include atmospheric tower bottoms, vacuum tower bottoms, oil sands and bitumen. Heavy oil can also be contained in pyrolysis oil made from biomass.

Chemical looping steam reforming processes use a metal catalyst that cycles from the metal oxide to the reduced form in two separate reactor vessels. These processes are limited to light gasses or light hydrocarbons (Lyon, 2007).

Reforming processes in general are limited to light hydrocarbon feedstocks because heavy oil feedstocks produce excessive coke, solids or viscous liquids that physically block the packed bed reactor. Moderately heavy feedstocks like naphtha require two catalysts. Reforming processes are also limited by high-sulfur feedstocks: the sulfur reacts with the reforming catalyst, for example a nickel catalyst, and deactivates it.

There remains a need in the art for a steam reforming process that can convert low-value heavy oil, such as atmospheric tower bottoms, vacuum tower bottoms, oil sands, bitumen oil and biomass pyrolysis oil, into hydrogen, a higher value feedstock that has many uses in the refinery and in other applications. There also remains a need in the art for a process to produce hydrogen from heavy oil that does not suffer from irreversible catalyst deactivation, either from irreversible coke formation or sulfur poisoning. Existing processes such as gasification are very high temperature and capital intensive processes and there remains a need in the art for a hydrogen production process from heavy oil that uses lower temperatures than gasification, which operates at or above about 1100° C.

BRIEF SUMMARY OF THE INVENTION

The present invention is directed to a process that satisfies the need to produce hydrogen from heavy oil feedstocks. In the specification and the attached drawings and various views of the invention the process may be referred to as HyRes or the HyRes process. As this term implies the process can produce hydrogen (Hy) from residuum (Res), and similar heavy oil feedstocks. The process comprises a reforming process that converts heavy oil, for example but not limited to heavy tower bottoms, vacuum tower bottoms, residuum, pyrolysis oil, to a hydrogen-rich syngas. The process of the present invention solves limitations in existing processes by allowing the continuous production of hydrogen (or syngas) with a solid catalyst while avoiding deactivation, reactor plugging, or irreversible coke formation on the catalyst surface when using problematic heavy oil feedstocks. The process also produces a superior hydrogen or syngas product stream because it is very low in nitrogen as a result of the process not requiring any added air in the reforming bed. The process of the present invention transports oxygen to the reforming bed in the form of NiO (nickel oxide) that is produced in the regeneration bed. The undiluted syngas from the present invention has a higher value than syngas mixed with nitrogen (air). For example, the composition of syngas produced by an air blown coal gasifier is 60% $N_2$, 12% CO, 9% $CO_2$, 1.5% $CH_4$ and 10% $H_2$. In contrast, the syngas from this invention typically contains no nitrogen, 8% CO, 21% $CO_2$, <1% $CH_4$ and 70% $H_2$. The process uses a mixture of a fluidizable reforming catalyst mixed with another high crush strength fluidizable solid material. The nickel-based reforming catalyst must also have certain physical properties that are described in greater detail in this application, which allow this process to operate continuously without the problems described in the BACKGROUND. An aspect of this process is a combination of the nickel-based catalyst with appropriate physical properties and the alpha-alumina as a solid diluent. This solid mixture makes the process operate continuously, while avoiding irreversible coke build-up on the catalyst when using heavy oil feedstocks. The mixture is also more economical than using a pure nickel catalyst solid composition.

The process produces hydrogen in refineries at a cost that is considerably lower than hydrogen produced from conventional technologies or purchasing hydrogen from a third party. This technology converts "bottom of the barrel" residuum into hydrogen. In the process residuum is steam reformed over nickel based catalysts to produce hydrogen without catalyst deactivation and without the need for an oxygen plant; this greatly expands the range of feedstocks that can be used to generate hydrogen. The process can steam reform residuum over nickel based catalysts without catalyst deactivation because the system uses a fluidized bed with periodic catalyst regeneration with air.

The process can use atmospheric tower bottoms (ATB) various grades of vacuum tower bottoms (VTB). VTB samples are generally solids at room temperature. A medium VTB can be heated to be able to feed it into the laboratory reactor, and a heavy VTB had to be cut with 20% xylene and heated to a pumpable liquid melt. With ATB, it was possible to operate with steam-to-carbon (S/C) ratios as low as about 3 without catalyst deactivation. VTB feeds required operating with a steam/carbon ratio of about 5, which is the same steam to carbon ratio needed with much lighter feeds such as natural gas and petroleum naphtha when using conventional fixed bed reformers; thus, the present invention is capable of processing heavy feedstocks without the need to generate more steam than would be required for a conventional light hydrocarbon steam reformer Catalyst deactivation is avoided with a ATB or a VTB feedstock.

An embodiment of the invention is a heavy oil steam reforming process to produce hydrogen, the process comprising: providing a heavy oil feedstock; providing a steam feedstock; providing a fuel feedstock; providing an air feedstock; providing at least one circulating fluidized bed reactor; providing a fluidizable nickel-containing reforming catalyst; using the fluidizable nickel-containing reforming catalyst in a reforming step in a bubbling fluidized reaction, wherein the reforming step is performed at about 865 to 900°

C. and a pressure of about 50 to 100 psig; using the fluidizable nickel-containing reforming catalyst in a regeneration step in a bubbling fluidized reaction, wherein the regeneration step is performed at about 865 to 900° C. and at a pressure of about 50 to 100 psig; allowing the fluidizable nickel-containing reforming catalyst to contact the heavy oil feedstock and the steam feedstock in the reforming step, wherein the reforming step is operated under conditions such that the product of the weight hourly space velocity (WHSV) of the heavy oil feedstock and the time online equals from 0.001 to 10; allowing the fluidizable mixture to contact the air feedstock and the fuel feedstock in the regeneration step to remove sulfur and carbon buildup; repeatedly cycling the fluidizable nickel-containing reforming catalyst between the reforming step and the regeneration step; and, producing hydrogen as a product of the reforming step.

An embodiment of the invention is a heavy oil steam reforming process to produce hydrogen, the process comprising: providing a heavy oil feedstock; providing a steam feedstock; providing a fuel feedstock; providing an air feedstock; providing a circulating fluidized bed reactor, the circulating fluidized bed reactor having a reforming bed and a regeneration bed, wherein the reforming bed and the regeneration bed are operably connected to each other; providing a mixture of a fluidizable solid, for example alpha-alumina, spinel, and the like being substantially inert, with a high melting temperature (higher than operating conditions—for example not silica) and physically hard or otherwise having resistance to attrition, and a fluidizable nickel-containing reforming catalyst, wherein, the nickel-containing reforming catalyst has a nickel content of from 10-20 weight percent on a magnesium aluminate support, a particle size from 63 to 225 um; operating the circulating fluidized bed reactor with the reforming bed at about 865 to 870° C. and the regeneration bed at about 865 to 900° C., wherein the pressure of the circulating fluidized bed reactor is about 50 to 100 psig, and allowing the mixture of fluidizable alpha-alumina and the fluidizable nickel-containing catalyst to contact a mixture of the heavy oil feedstock and the steam feedstock in the reforming bed from about 90 to 120 minutes, and; producing hydrogen as a product of the reforming bed.

Optionally, in an embodiment the fluidizable nickel-containing reforming catalyst is from 25 to 75 weight percent of the mixture of fluidizable alpha-alumina and fluidizable nickel-containing reforming catalyst.

In a further embodiment the fluidizable nickel-containing reforming catalyst is about 25 weight percent of the mixture of fluidizable alpha-alumina and fluidizable nickel-containing reforming catalyst.

In a further embodiment the fluidizable nickel-containing reforming catalyst is about 50 weight percent of the mixture of fluidizable alpha-alumina and fluidizable nickel-containing reforming catalyst.

In a further embodiment the fluidizable nickel-containing reforming catalyst is about 75 weight percent of the mixture of fluidizable alpha-alumina and fluidizable nickel-containing reforming catalyst.

In an embodiment the fuel feedstock in the process may be petcoke.

In an optional embodiment the process further comprises transporting the mixture of a fluidizable solid and the fluidizable nickel-containing catalyst with coke and sulfur build-up from the reforming bed to the regeneration bed, and supplying to the regeneration bed the fuel feedstock and the air feedstock to remove coke and sulfur from the mixture of fluidizable alpha-alumina and the fluidizable nickel-containing catalyst, the sulfur removed in the form of sulfur dioxide, and the average contact time for the mixture of fluidizable alpha-alumina and fluidizable nickel-containing reforming catalyst in the regeneration bed is about 40 to 60 minutes.

In a further embodiment the process comprises converting the nickel-containing catalyst to the nickel-oxide form in the regeneration bed and allowing the mixture of fluidizable alpha-alumina and the fluidizable nickel-containing catalyst to transport to the reforming bed in a continuous looping process.

In another embodiment the process comprises generating a synthesis gas product stream with at least 25 (more preferably at least 60) volume % hydrogen and at most 1 (more preferably at most 0.5) volume % nitrogen.

In another embodiment the process comprises operating the circulating fluidized bed reactor with essentially no supplemental oxygen for the reforming bed, other than the oxygen transported in the form of nickel-oxide from the regeneration bed and oxygen contained in the steam feedstock and in the heavy oil feedstock.

In yet another embodiment the process further comprises operating the reforming bed with an S/C ratio between about 1.5 and 13.6, alternatively a from about 3 to about 5, or alternatively greater than about 1.

In preferred embodiments the heavy oil is atmospheric tower bottoms (also called long residuum or atmospheric residuum), or alternatively vacuum tower bottoms (also called vacuum residuum).

Another embodiment is a fluidized bed heavy oil steam reforming process using a regenerable catalyst to produce hydrogen, the process comprising: providing a hydrocarbon feedstock that has an API gravity between −11 and +54 (tar sand bitumen to heavy naphtha); providing a steam feedstock; providing a fuel feedstock (hydrocarbon feedstock or petroleum coke); providing an air feedstock; providing a circulating fluidized bed reactor, the circulating fluidized bed reactor having a reforming bed and a regeneration bed, wherein the reforming bed and the regeneration bed are operably connected to each other; providing a mixture of a fluidizable solid (for example, alpha-alumina) and a fluidizable nickel-containing reforming catalyst; operating the circulating fluidized bed reactor with the reforming bed at about 865 to 870° C. and the regeneration bed at about 865 to 900° C., the system pressure at about 50 to 100 psig, and allowing the mixture of fluidizable solid (alpha-alumina) and the fluidizable nickel-containing catalyst to contact a mixture of the hydrocarbon feedstock and the steam feedstock in the reforming bed for a period of time such that the product of the weight hourly space velocity (WHSV) and the time online equals from 0.001 to 10, preferably 0.01 to 1.64 and more preferably 0.01 to 0.25; allowing the mixture of fluidizable alpha-alumina and the fluidizable nickel-containing catalyst with coke and sulfur build-up from the reforming bed to transport to the regeneration bed, and supplying to the regeneration bed the fuel feedstock and the air feedstock to remove coke and sulfur from the mixture of fluidizable alpha-alumina and the fluidizable nickel-containing catalyst; converting the nickel-containing catalyst to the nickel-oxide form in the regeneration bed and allowing the mixture of fluidizable alpha-alumina and the fluidizable nickel-containing catalyst to transport to the reforming bed in a continuous looping process; generating a synthesis gas product stream with at least 25 volume % (more preferably 60 volume %) hydrogen and at most 1.0 volume % (more preferably 0.5 volume %) nitrogen; operating the circulating fluidized bed reactor with essentially no supplemental oxygen for the reforming bed, other than the oxygen transported in the form of nickel-oxide from the regeneration bed and oxygen contained in the steam feedstock and in the heavy oil feedstock; operating the reforming bed with an S/C ratio between about 1.5 and 13.6, wherein, the nickel-containing reforming catalyst has a nickel content of from 10-20 weight percent, a magnesium aluminate support, a particle size from 63 to 225 um, and; producing hydrogen as a product of the reforming bed.

In further embodiments the fluidizable nickel-containing reforming catalyst is from 25 to 75 weight percent of the mixture of fluidizable alpha-alumina and fluidizable nickel-containing reforming catalyst, and the S/C ratio is from about 3 to about 5.

In a preferred embodiment the heavy oil is selected from the group consisting of atmospheric tower bottoms, medium vacuum tower bottom, and heavy vacuum tower bottoms.

Another embodiment is a fluidized bed hydrocarbon steam reforming process using a regenerable catalyst to produce hydrogen, the process comprising: providing a hydrocarbon feedstock that has an API gravity between −11 and +54; providing a steam feedstock; providing a fuel feedstock; providing an air feedstock; providing a circulating fluidized bed reactor, the circulating fluidized bed reactor having a bed, wherein the bed is operated in an alternating manner, switching between two steps: reforming and regeneration; providing a mixture of a fluidizable solid and a fluidizable nickel-containing reforming catalyst; operating the fluidized bed reactor during the reforming step at about 865 to 870° C. and during the regeneration step at about 865 to 900° C., the system pressure at about 50 to 100 psig, and allowing the mixture of fluidizable solid and the fluidizable nickel-containing catalyst to contact a mixture of the hydrocarbon feedstock and the steam feedstock in the reforming step for a period of time such that the product of the weight hourly space velocity (WHSV) and the time online equals from 0.001 to 10, preferably 0.01 to 1.64 and more preferably 0.01 to 0.25; operating the fluidized bed reactor during the regeneration step at about 900° C., the system pressure at about 50 to 100 psig, and allowing the mixture of fluidizable solid and the fluidizable nickel-containing catalyst to contact a fuel feedstock and the air feedstock to remove coke and sulfur from the mixture of fluidizable solid and the fluidizable nickel-containing catalyst; converting the nickel-containing catalyst to the nickel-oxide form during the regeneration step; generating a synthesis gas product stream with at least 25 volume % hydrogen and at most 1.0 volume % nitrogen; operating the circulating fluidized bed reactor with essentially no supplemental oxygen for the reforming step, other than the oxygen in the form of nickel-oxide from the regeneration step and oxygen contained in the steam feedstock and in the heavy oil feedstock; operating the reforming bed with an S/C ratio at least 1.0, wherein, the nickel-containing reforming catalyst has a nickel content of from 10-20 weight percent, a magnesium aluminate support, a particle size from 63 to 225 um, and; producing hydrogen as a product of the reforming bed.

Another embodiment of the invention is a fluidized bed hydrocarbon steam reforming process using a regenerable catalyst to produce hydrogen, the process comprising: providing a hydrocarbon feedstock that has an API gravity between −11 and +54; providing a steam feedstock; providing a fuel feedstock; providing an air feedstock; providing a circulating fluidized bed reactor, the circulating fluidized bed reactor having a bed, wherein the bed is operated in an alternating manner, switching between two steps: a reforming step and a regeneration step; providing a fluidizable mixture, the fluidizable mixture comprising a fluidizable solid and a fluidizable nickel-containing reforming catalyst; operating the fluidized bed reactor during the reforming step at about 865 to 900° C. and at about 50 to 100 psig, and during the regeneration step at about 900° C. and at about 50 to 100 psig, and allowing the fluidizable mixture to contact the hydrocarbon feedstock and the steam feedstock in the reforming step for a time such that the product of the weight hourly space velocity (WHSV) of the hydrocarbon feedstock and the time online equals from 0.001 to 10; operating the fluidized bed reactor during the regeneration step at about 900° C., at a pressure of about 50 to 100 psig, and allowing the fluidizable mixture to contact the fuel feedstock and the air feedstock to remove coke and sulfur from the fluidizable mixture; converting the fluidizable nickel-containing reforming catalyst to a nickel-oxide form during the regeneration step; generating a synthesis gas product stream with at least 60 volume % hydrogen on a dry weight basis and at most 1.0 volume % nitrogen on a dry weight basis; operating the circulating fluidized bed reactor with essentially no supplemental oxygen for the reforming step, other than the oxygen in a form of nickel-oxide from the regeneration step and oxygen contained in the steam feedstock and in the hydrocarbon feedstock; and, operating the reforming step with a steam-to-carbon ratio at least 1.0, wherein, the fluidizable nickel-containing reforming catalyst has a nickel content of from 10-20 weight percent, a magnesium aluminate support, a particle size from 63 to 225 um. Optionally, the process the reforming step is operated under conditions such that the product of the weight hourly space velocity (WHSV) of the hydrocarbon feedstock and the time online equals from 0.01 to 1.64, and more preferably the reforming step is operated under conditions such that the product of the weight hourly space velocity (WHSV) of the hydrocarbon feedstock and the time online equals from 0.01 to 0.25.

In a preferred embodiment, the method is a heavy oil steam reforming process to produce synthesis gas hydrogen, the process comprising essentially of: providing a heavy oil feedstock; providing a steam feedstock; providing a fuel feedstock; providing an air feedstock; providing at least one circulating fluidized bed reactor; providing a fluidizable nickel-containing reforming catalyst; using the fluidizable nickel-containing reforming catalyst in a reforming step in a bubbling fluidized reaction, wherein the reforming step is performed at about 865 to 900° C. and a pressure of about 50 to 100 psig; using the fluidizable nickel-containing reforming catalyst in a regeneration step in a bubbling fluidized reaction, wherein the regeneration step is performed at about 865 to 900° C. and at a pressure of about 50 to 100 psig; allowing the fluidizable nickel-containing reforming catalyst to contact the heavy oil feedstock and the steam feedstock in the reforming step, wherein the reforming step is operated under conditions such that the product of the weight hourly space velocity (WHSV) of the heavy oil feedstock and the time online equals from 0.001 to 10; allowing the fluidizable mixture to contact the air feedstock and the fuel feedstock in the regeneration step to remove sulfur and carbon buildup; repeatedly cycling the fluidizable nickel-containing reforming catalyst between the reforming step and the regeneration step; and, producing hydrogen as a product of the reforming step.

For the above and below embodiments that recite the transition phrase "consisting essentially of", the invention is limited in scope to those steps specified and those that do not materially affect the basic and novel characteristics of the invention. The basic and novel characteristics of the invention are that while using a heavy oil feedstock to generate a synthesis gas product stream with at least 25 volume % hydrogen on a dry weight basis and at most 1 volume % nitrogen on a dry weight basis as a product of the steam reforming step, the method does not generate irreversible fouling on the fluidizable nickel-containing steam reforming catalyst at least until the catalyst particles have passed through the reformer reactor a minimum of 50 times.

In further embodiments the method consists essentially of generating the synthesis gas product stream with at least 60 volume % hydrogen on a dry weight basis and at most 0.5 volume % nitrogen on a dry weight basis, and/or operating the fluidized bed reactor with essentially no supplemental oxygen during the reforming step, other than the oxygen transported in a form of nickel-oxide and that which is contained in the heavy oil feedstock.

In a preferred embodiment, the method is s heavy oil steam reforming process to produce synthesis gas hydrogen, the process consisting essentially of: providing a heavy oil feedstock; providing a steam feedstock; providing a fuel feedstock; providing an air feedstock; providing a steam reforming fluidized bed reactor; providing a catalyst regeneration fluidized bed reactor, wherein the catalyst regeneration fluidized bed reactor is operably connected to a dilute phase pneumatic transport riser that exits the catalyst regeneration fluidized bed reactor; providing a fluidizable nickel-containing steam reforming catalyst, wherein the fluidizable nickel-containing steam reforming catalyst has a nickel content of from 10-20 weight percent; providing a first stand pipe, connecting the steam reforming fluidized bed reactor to the catalyst regeneration fluidized bed reactor, wherein the first stand pipe has either a first loop seal or a first slide valve; providing a second stand pipe, connecting the catalyst regeneration fluidized bed reactor to the steam reforming fluidized bed reactor, wherein the second stand pipe has either a second loop seal or a second slide valve; continuously transporting the fluidizable nickel-containing steam reforming catalyst from the steam reforming fluidized bed reactor to the catalyst regeneration fluidized bed reactor and back to the steam reforming fluidized bed reactor in a continuous looping process, wherein the fluidizable nickel-containing steam reforming catalyst leaving the steam reforming fluidized bed reactor transports through the first standpipe and then into the catalyst regeneration fluidized bed reactor, and wherein the fluidizable nickel-containing steam reforming catalyst leaving the catalyst regeneration fluidized bed reactor transports through the riser and then through the second standpipe and then into the steam reforming fluidized bed reactor; using the fluidizable nickel-containing steam reforming catalyst in a steam reforming step in a fluidized reaction, wherein the steam reforming step is performed at 850 to 950° C. and a pressure of 50 to 100 psig; using the fluidizable nickel-containing steam reforming catalyst in a regeneration step in a bubbling fluidized reaction, wherein the regeneration step is performed at 850 to 1100° C. and at a pressure of 50 to 100 psig; allowing the fluidizable nickel-containing steam reforming catalyst to contact the heavy oil feedstock and the steam feedstock in the steam reforming step, wherein the steam reforming step is operated under conditions such that the product of the weight hourly space velocity (WHSV) of the heavy oil feedstock and the time online equals from 0.001 to 10; allowing the fluidizable mixture to contact the air feedstock and the fuel feedstock in the regeneration step to remove sulfur and carbon buildup; not generating irreversible fouling on the fluidizable nickel-containing steam reforming catalyst while using the heavy oil feedstock to produce synthesis gas in the steam reforming fluidized bed reactor; and generating a synthesis gas product stream with at least 25 volume % hydrogen on a dry weight basis and at most 1 volume % nitrogen on a dry weight basis as a product of the steam reforming step and as a product stream directly exiting the steam reforming fluidized bed reactor. Optionally, the method further consists essentially of: controlling solid concentration and residence time of the fluidizable nickel-containing steam reforming catalyst in the steam reforming fluidized bed reactor and the catalyst regeneration fluidized bed reactor by controlling solid flow at either the first loop seal, the second loop seal, the first slide valve or the second slide valve. In further optional embodiments the steam reforming step is operated under conditions such that the product of the weight hourly space velocity (WHSV) of the heavy oil feedstock and the time online equals from 0.01 to 1.64, or the steam reforming step is operated under conditions such that the product of the weight hourly space velocity (WHSV) of the heavy oil feedstock and the time online equals from 0.01 to 0.25.

In yet another optional embodiment the method further consists essentially of: providing a fluidizable mixture of the fluidizable nickel-containing steam reforming catalyst and a fluidizable solid diluent, wherein the fluidizable nickel-containing steam reforming catalyst is from 25 to 75 weight percent of the fluidizable nickel-containing mixture, optionally wherein the fluidizable nickel-containing steam reforming catalyst is about 75 weight percent of the fluidizable mixture, or optionally wherein the fluidizable nickel-containing steam reforming catalyst has a magnesium aluminate or calcium alum inate support, and a particle size from 100 to 250 μm.

In a more preferred embodiment the process further consists essentially of: generating the synthesis gas product stream with at least 60 volume % hydrogen on a dry weight basis and at most 1 volume % nitrogen on a dry weight basis.

In an embodiment the process further consists essentially of: operating the fluidized bed reactor with essentially no supplemental oxygen during the steam reforming step, other than the oxygen transported in a form of nickel-oxide and that which is contained in the steam and in the heavy oil feedstock, or, further consisting essentially of operating the steam reforming step with a steam/carbon ratio greater than about 1, more preferably the steam-to-carbon ratio from about 3 to about 5.

The heavy oil may be either long residuum or atmospheric residuum, vacuum residuum or petcoke.

The process may further consist essentially of: converting the fluidizable nickel-containing reforming catalyst to a nickel-oxide form in the regeneration fluidized bed and allowing the fluidizable nickel-containing steam reforming catalyst to transport to the steam reforming fluidized bed in a continuous looping process.

The steam reforming fluidized bed reactor may be operated in the bubbling flow regime and the catalyst regenerating fluidized bed reactor may be operated in the turbulent flow regime, or both may be operated in the turbulent flow regime.

DETAILED DESCRIPTION OF THE INVENTION

Figure 1:
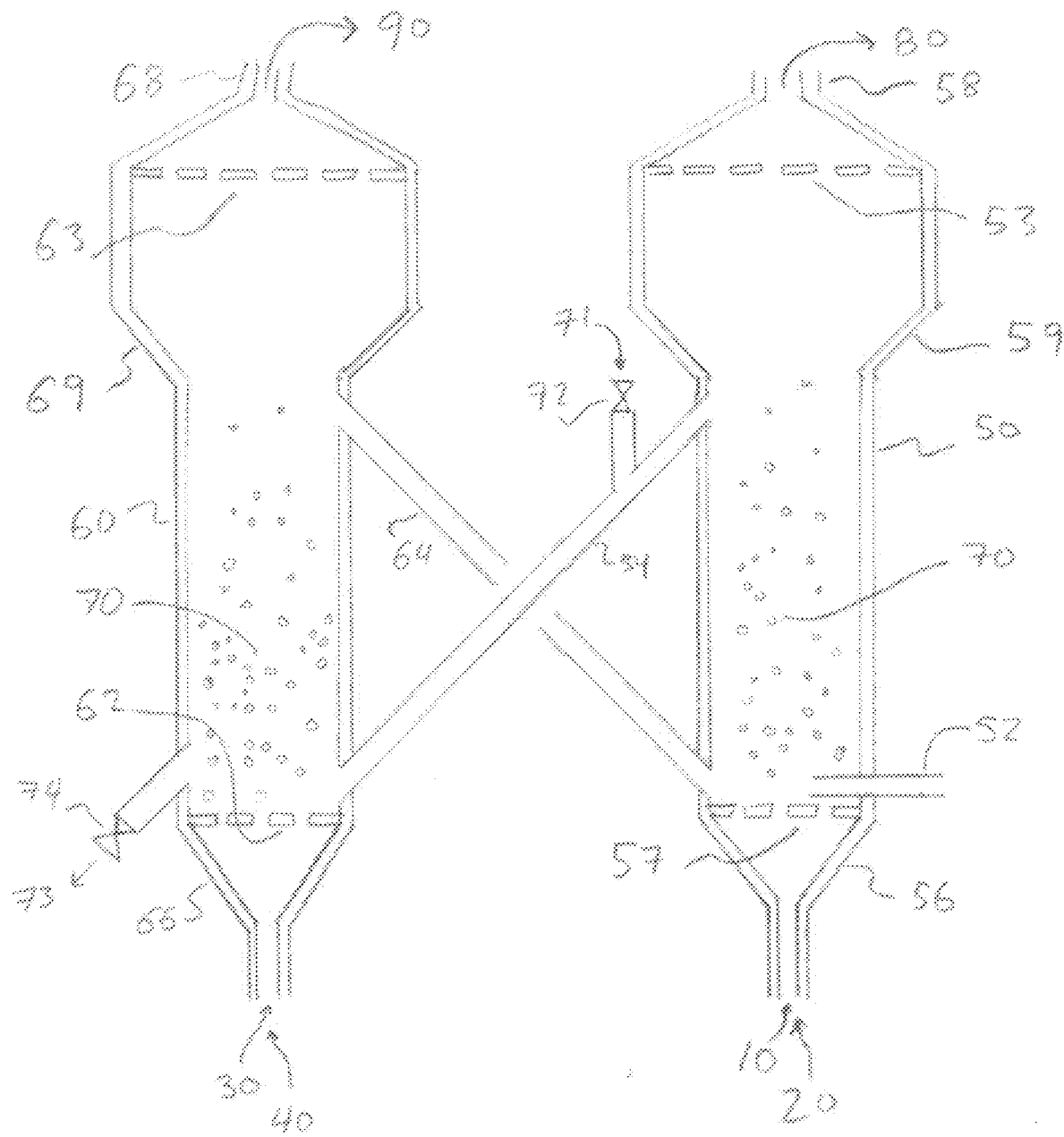
FIG. 1. Circulating fluidized bed HyRes process.

The summary of the invention above and in the Detailed Description of the Invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, and article "comprising" (or "which comprises") component A, B, and C can consist of (i.e. contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending on the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example 25 to 100 mm means a range whose lower limit is 25 mm, and whose upper limit is 100 mm.

Heavy oil is a hydrocarbon with an American Petroleum Institute (API) gravity between about −11 and 20 which encompasses oil (tar) sand bitumen, vacuum residuum, atmospheric residuum and heavy gas oil. Heavy hydrocarbons have higher concentrations of high molecular weight hydrocarbons, have more aromatic hydrocarbon character, and typically have higher concentrations of sulfur, metals and other contaminants.

The API gravity is related to the specific gravity of the material by API=141.5/(sp gr 60/60° F.)−131.5, where (sp gr 60/60° F.) refers to the density of the material at 60° F. divided by the density water at 60° F. In general, the lower the value of the API gravity, the heavier the petroleum fraction or crude oil (ASTM D1298-99 "Standard Test Method for Density, Relative Density (Specific Gravity), or API Gravity of Crude Petroleum and Liquid Petroleum Products by Hydrometer Method.")

Bitumen is a heavy hydrocarbon with an API gravity between about −11 and 17, generally derived from oil (tar) sand deposits but can also refer to any feedstock that is composed primarily of hydrocarbons that have API gravities between about −11 and 17.

Naphtha refers to that fraction of crude petroleum from atmospheric pressure distillation that boils between 55° F. and 300° F. and is divided into light naphtha (b.p.=55-175° F., ° API~80), medium naphtha (b.p.=175-300° F., ° API~55) and heavy naphtha (b.p.=300-400° F., ° API~47).

Kerosine (sometimes spelled Kerosene) refers to the atmospheric distillate cut that boils between 400-500° F. (° API~40).

Atmospheric gas oil refers to an atmospheric distillate fraction that boils between 500 and 650° F. (° API~34).

Atmospheric tower bottoms (ATB, a.k.a. atmospheric residuum or long residuum) is all of the material with b.p.>650° F. (° API~20). It is commonly sent to a vacuum distillation unit or in some refineries, to a residuum fluid catalytic cracking (RFCC) unit.

Light vacuum gas oil (LVGO) is the fraction from vacuum distillation that has b.p.=650-850° F. (° API~27); heavy vacuum gas oil (HVGO) has b.p.=850-1050° F. and ° API~20.

Vacuum tower bottoms (VTB, a.k.a. vacuum residuum) is the material that boils above 1050° F. that has a gravity of ° API~10. It is typically used in the production of asphalt or petroleum coke. It should be noted that all boiling points listed above 650° F. (all of the vacuum fractions) are equivalent atmospheric boiling points calculated from data obtained at reduced pressures because these materials will decompose before boiling at atmospheric pressure.

Fluidizable solid is a solid material in a powder form, having a particle size suitable for fluidizing, and also being substantially inert and physically hard or otherwise having resistance to attrition. In addition, the fluidizable solid is preferably stable at high temperatures (the operating temperatures of the process), having a high melting point and being non-volatile under the operating conditions. Exemplary fluidizable solid materials include alpha alumina, and spinel.

Fluidizable mixture is a combination of two or more fluidizable solids. For example, a mixture of fluidizable alpha alumina and fluidizable nickel-containing reforming catalyst.

Weight Hourly Space Velocity (WHSV) is the weight of feed flowing per unit weight of the catalyst per hour. In the present invention, when the solid catalyst is used with a solid diluent, the total mass of the mixture of the solid catalyst and solid diluent are to be used as the mass of the catalyst to calculate WHSV.

The term "not generating irreversible fouling" on the fluidizable nickel-containing steam reforming catalyst while using the heavy oil feedstock to produce synthesis gas in the steam reforming fluidized bed reactor means that the catalyst does not accumulate permanent coke deposits that cannot be removed in the catalyst regeneration reactor after the catalyst particles have passed through the reformer reactor 50 times, and under the reformer reactor conditions of the claimed present invention. The accumulation of permanent coke deposits can be observed while operating reforming processes by an increase in the methane and higher hydrocarbon production in the product gas stream. In general, if the methane and/or total hydrocarbons in the product gas steam exceeds 10% on a dry gas basis this is because the catalyst has experienced irreversible fouling. Irreversible fouling of the catalyst can also manifest in methane concentrations in the product stream between about 5 mol % to 10 mol %, or higher. Irreversible fouling of the catalyst can also manifest in the catalyst particles becoming immovable and plugging the reactor system.

Fluidized bed reactors can be operate in different flow regimes with increasing gas velocity starting with the Particulate Regime and progressing with increasing gas velocity through the Bubbling Regime, the Slug Flow Regime, the Turbulent Regime, the Fast Fluidization and eventually reaching beyond the fluidization regimes and entering Pneumatic Conveying.

The invention relates to a process useful for producing hydrogen from a heavy oil feedstock. The process converts heavy oil (atmospheric tower bottoms, vacuum tower bottoms, residuum, pyrolysis oil, and similar feedstocks) to a hydrogen-rich syngas using a mixture of a nickel catalyst and a solid, wherein non-limiting examples include alumina or spinel. The feedstocks include the heavy oil, steam, air and optionally an additional fuel feedstock, such as petroleum coke (petcoke), to provide additional heat for the catalyst regeneration reaction. A circulating fluidized bed process has a reforming bed and a regeneration bed operably connected to each other with conduits for transporting the solids between each bed in a looping fashion. The steam and heavy oil are fed to the reforming bed where fluidized nickel catalyst and alumina are contacted with the feedstock producing a hydrogen-rich product gas. The solids circulate (fluidize) in the reforming bed for a period of time such that the product of the weight hourly space velocity (WHSV) and the time online equals from 0.001 to 10, preferably 0.01 to 1.64 and more preferably 0.01 to 0.25 at a temperature of about 865 to 870° C. and at a pressure of about 50 to 100 psig, or for a suitable time to prevent irreversible coke and/or sulfur fouling. The solids are moved to the regeneration bed where air, and optionally additional fuel, are added to combust the coke and sulfur at about 865 to 900° C. and optionally up to about 1000° C. This step removes the coke and sulfur from the catalyst.

An unexpected embodiment of the invention is how the process tolerates the sulfur present in a heavy oil feedstock. Sulfur in the feedstock reacts with the nickel in the catalyst to form nickel sulfides, which are then burned off during regeneration over numerous repeated cycles. By maintaining the correct rate of catalyst circulation between the reformer and the regenerator, the amount of sulfur (and carbon) that deposits on the catalyst during the reforming step can be kept low enough that the catalyst can surprisingly be regenerated with no permanent loss of activity. When sulfur and carbon are burned off in the regenerator, the nickel metal is converted into nickel oxide (NiO), which is catalytically inactive for hydrocarbon steam reforming. However, when the catalyst (now as $NiO/MgAl_2O_4$) is exposed to hydrocarbons, the NiO is reduced back to catalytically active Ni metal and hydrocarbon steam reforming resumes.

A reason for the low cost of the HyRes process is that it has the advantages of oxygen gasification without requiring an oxygen plant (which at an industrial scale would most likely be a cryogenic plant). Because no air is introduced into the gasifier, no nitrogen is added to the syngas, which improves the efficiency of $H_2$ recovery.

The feedstock can be a hydrocarbon stream in the refinery, preferably low value materials such as residuum, catalytic cracker slurry oil, ATB and vacuum gas oil (VGO). Another optional feedstock for HyRes is oil sand bitumen. The hydrogen produced by HyRes may further be used for upgrading bitumen to synthetic crude oil. Another optional feedstock is "dilbit," which is raw bitumen mixed with 30% condensate (to make the bitumen fluid).

An embodiment of the invention is that the heat capacity of the solids (catalyst and solid diluent) can supply the heat of steam reforming in the fluidized bed reactor.

Advantages and embodiments of the invention include: (1) A wide variety of heavy (and light) hydrocarbon feedstocks can be used for syngas generation; (2) Syngas is produced at moderate temperatures (~850 to 900° C.) and pressures (ca. 40 to 100 psig) so expensive refractory lined pressure vessels are not required for low pressure operation; (3) Coke and sulfur deposited on the catalyst are burned off in a regenerator using air generating $SO_2$ (which is may optionally be scrubbed out after cooling the hot flue gas) and $CO_2$; (4) no nitrogen is introduced into the syngas (as in an air blown gasifier); (5) no oxygen plant is needed as in a $O_2$ blown gasifier or autothermal reformer (ATR); (6) syngas may be shifted upstream of the PSA unit using a sour shift catalyst, which improves the energy efficiency of the process; (7) flue gas from the regenerator may be used to raise steam, which improves process efficiency; (8) high purity $H_2$ can be produced from commercially available PSA systems; (9) the PSA off gas can be burned as fuel gas for increased overall energy efficiency; (10) hot gas exiting the regenerator can be used to generate steam; (11) the catalyst can tolerate heavy oil components (e.g. high MW aromatics) without fouling because of intermittent regeneration in air; (12) short reforming times minimizes sulfur and carbon accumulation so that they can be burned off in the regenerator before reaching damaging; (13) Capital costs for circulating fluidized beds are considerately lower than those associated with a conventional coal/coke gasifier or conventional steam methane reformer; and (14) catalyst can be removed continuously (or semi-continuously), to prevent excessive buildup of Ni and V. It is understood that some build-up of nickel is not detrimental, as the catalyst is based on nickel.

The nickel catalyst is a magnesium aluminate that contains about 10 to 20 weight percent nickel. The particle size is between 63 and 225 um. In one example, the alumina has a particle size of about 60 to 90 um and is essentially comprised of alpha-alumina. The nickel catalyst and alumina are used as a mixture of between about 25 to 75 weight percent nickel catalyst.

The reforming bed is operated at about 865-870° C., 50-100 psig and an average catalyst contact time of a period of time such that the product of the weight hourly space velocity (WHSV) and the time online equals from 0.001 to 10, preferably 0.01 to 1.64 and more preferably 0.01 to 0.25. Non-limiting examples of the fuel feedstock are heavy oil, petcoke or mixtures thereof.

Regeneration is operated at about 865-1000° C., about 50 to 100 psig, and with an average catalyst contact time of about 40 to 60 minutes.

The nickel catalyst changes from Ni to NiO and back to Ni in the process. The regeneration bed converts it to NiO and when it reaches the reforming bed the hydrocarbons reduce it back to catalytically active Ni.

The syngas produced by the reforming bed contains at least 25 volume %, preferably at least 60 volume % hydrogen or a $H_2$ to CO mole ratio of 4 to 7. No air is introduced into the reforming bed, which allows the process to produce a high-purity syngas product that contains little to no nitrogen, for example less than 1.0 volume % nitrogen.

Steam to carbon ratios are set from 1 to 13.6, or at least 3 and more preferably at least 5. It is desirable to use the lowest steam to carbon ratio that prevents coke buildup.

The heavy oil feedstock is typically a low-value, hard to process heavy component from crude oil refining. Other heavy oil can be produced by the pyrolysis of biomass. Non-limiting examples of heavy oil feedstocks include atmospheric tower bottoms, vacuum tower bottoms, oil sands bitumen, biomass pyrolysis oil, solid municipal waste pyrolysis oil, and residuum. The ATB and VTB samples used in the examples below were obtained from U.S. refineries, the bitumen was obtained from a Canadian oil sands producer, biomass pyrolysis oil was obtained from the National Renewable Energy Laboratory, and the NorPar 12 was purchased from ExxonMobil.

In the accompanying examples, the use of various feedstocks was reduced to practice in the HyRes process: These non-limiting examples of feedstocks include: (1) atmospheric tower bottoms (atmospheric residuum) from the Valero Krotz Springs refinery; (2) a medium heavy vacuum tower bottoms (vacuum residuum) from Valero's Corpus Christi refinery; (3) a very heavy vacuum tower residuum from an ExxonMobil Louisiana refinery; (4) diluted tar sand bitumen from Canada; (5) Norpar 12, an ExxonMobil solvent product; and (6) biomass fast pyrolysis oil from the National Renewable Energy Laboratory (NREL).

Valero's Krotz Springs refinery is a topping refinery as there is no vacuum unit. Atmospheric tower bottoms (ATB) is sent to the fluid catalytic cracker (FCC) to make a low octane FCC gasoline. Naphtha from the crude unit is reformed and mixed with polymerized FCC naphtha and isomerate to make gasoline. ATB is the stream from atmospheric distillation of crude oil that boils at >650° F. that is normally sent to vacuum distillation. The ATB has an elemental composition of 86.64 wt % carbon, 12.15 wt % hydrogen, 0.12 wt % nitrogen, 0.55 wt % oxygen and 0.81 wt % sulfur (and an H to C ratio of 1.68 on a mole basis). The ATB was pourable at room temperature. Sulfur reacts with the nickel in typical steam reforming catalysts. However, in the HyRes process, surface sulfur is burned off during regeneration (forming NiO and SOx) before bulk nickel sulfides can form that would irreversibly damage the catalyst.

Vacuum Tower Bottoms were received from the Valero Corpus Christi Plant. Normally vacuum tower bottoms (residuum) has the consistency of tar (solid at room temperature); however, the VTB from the Corpus Christi plant is far less viscous. Therefore we refer to the Corpus Christi VTB as "medium" VTB. The elemental analysis from the Corpus Christi medium VTB is 87.09 wt % carbon, 12.42 wt % hydrogen, 0.21 wt % nitrogen, 0.28 wt % oxygen and 0.27 wt % sulfur. The hydrogen to carbon (H/C) ratio is about the same as that of the Krotz Springs ATB; however, the Corpus Christi VTB is lower in sulfur.

Heavy VTB was received from ExxonMobil. The heavy VTB was a solid at room temperature and had an elemental composition of 86.09 wt % carbon, 10.98 wt % hydrogen, 0.43 wt % nitrogen, 0.52 wt % oxygen and 2.02 wt % sulfur. The H/C ratio was 1.53.

ExxonMobil Norpar 12 was used as a kerosine simulant. Norpar 12 (normal paraffin) is a ~50:50 mixture of $C_{11}$ (b.p.=379° F.) & $C_{12}$ (b.p.=417° F.) n-paraffins.

Biomass Fast Pyrolysis Oil was received from NREL (National Renewable Energy Lab, Golden Colo.). In pyrolysis, biomass is heated in the absence of air to generate a bio-oil that contains water, water soluble organics, and a water insoluble phase (primarily phenolic compounds produced from the lignin). The other products are char and gas, and these can be minimized by increasing the rate of pyrolysis, to maximize the bio-oil yield. There are several problems with converting bio-oil into chemicals and fuels. First, raw bio-oil is unstable and will slowly polymerize if left to stand unless stabilized (it contains a lot of reactive species such as aldehydes). Second, it is a very complex mixture of compounds. These properties make direct conversion of pyrolysis oil to fuels and chemicals difficult.

An as-received sample (brown liquid) was characterized prior to use. The density was 1.127 g/cc and the pH was 3. It was preferentially soluble in water but not hexanes consistent with containing not only water but also polar organic compounds. The elemental composition was 27.36 wt % carbon, 8.81 wt % hydrogen, 62.85 wt % oxygen and it had an H/C ratio of 3.86 on a mole basis)

In a preferred embodiment the catalyst is a commercial steam methane reforming catalyst (a non-limiting example is the commercial product Topsøse R-67-7H). This catalyst is mixed with low surface area $\alpha$-$Al_2O_3$ where both solids have been screened to have particle sizes near 100 um. R-67-7H, which is manufactured by Haldor Topsøe, contains about 12 wt % Ni supported on a $MgAl_2O_4$ carrier. Both the R-67-7H and the $\alpha$-$Al_2O_3$ are very hard, attrition resistant materials (necessary for durability in a fluidized bed reactor). Topsøse R-67-7H is a reforming catalyst with >12 wt % nickel, $SiO_2$ wt %<0.2 wt %, and a nickel surface area of 3.5-5 m2/g.

The base material of the R-67-7H carrier is magnesium aluminate, a ceramic inert oxide of the spinel family known for excellent stability at the entire range of temperatures. Furthermore, the catalyst does not suffer any degradation, either by exposure to condensing steam during start-up or by high temperature steaming, and in the case of HyRes is not damaged by repeated cycles of steam reforming and regeneration, nor by controlled exposure to coke and sulfur. Other suitable reforming catalysts with these properties may be substituted for R-67-7H.

Figure 2:
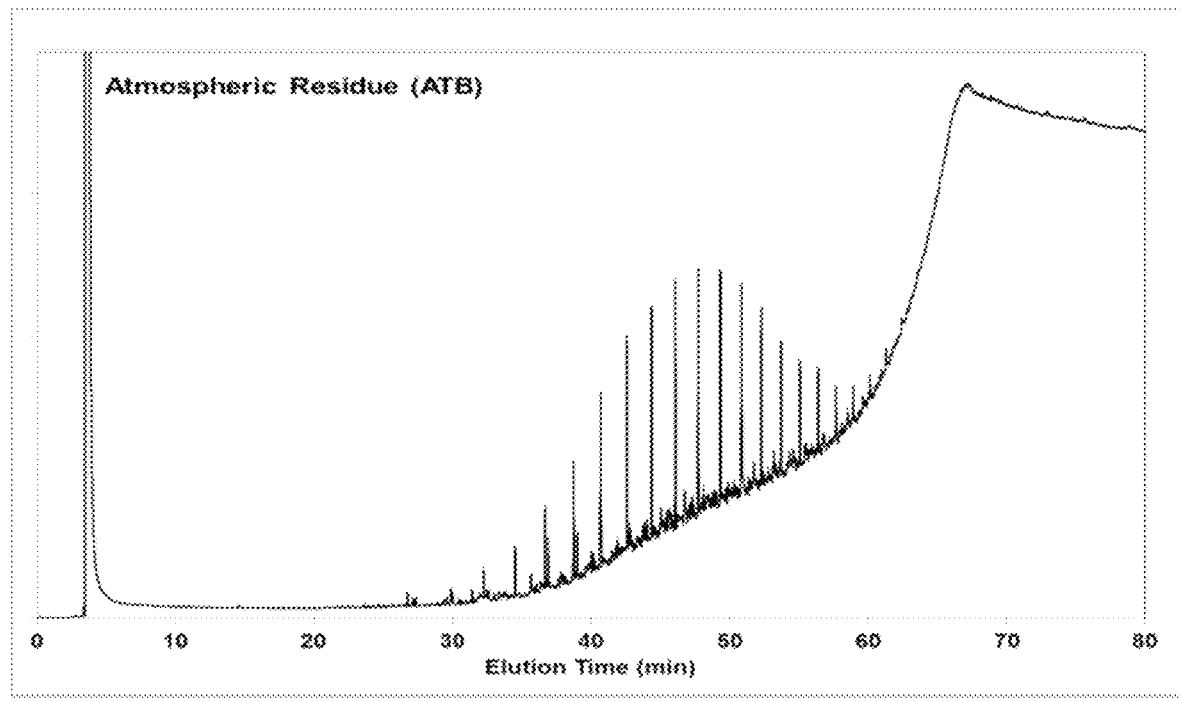
FIG. 2. Gas chromatogram of ATB.

Atmospheric tower bottoms (ATB) are produced in refineries. As an example, a capillary column gas chromatogram of a sample of ATB dissolved at a concentration of 10 mg/mL in dichloromethane is shown in FIG. 2. The data shown in FIG. 2 were obtained using a computer controlled Varian CP 3600 gas chromatograph equipped with a ASTM D2887 simulated distillation capillary column and a flame ionization detector (FID). The baseline increases due to column bleed at high temperatures (the temperature at the highest point in FIG. 2 occurs at T=340° C. (644° F.). Even though the ATB stream is typically 650+° F. material, small amounts of volatile hydrocarbons are still present that elute from the GC column between 30 and 60 min, which corresponds to about 250-600° F.

Figure 3:
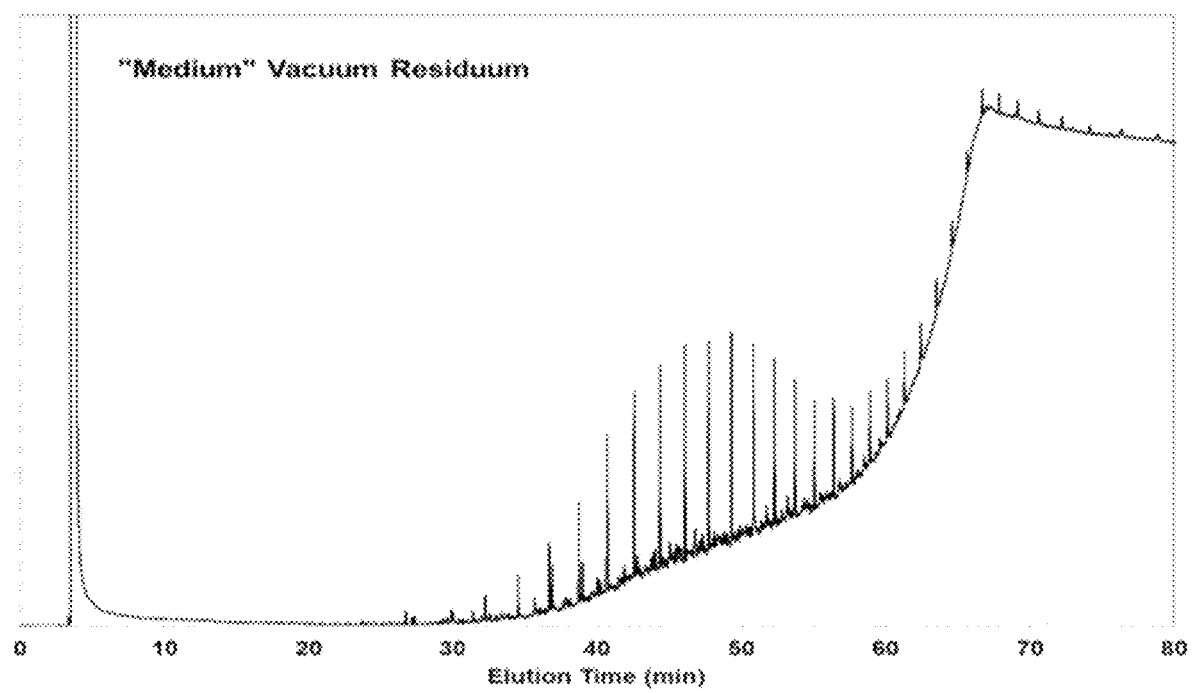
FIG. 3. Gas chromatogram of "medium" vacuum residuum.

An even heavier oil than ATB is medium vacuum tower bottoms. An example of a medium VTB sample from a refinery was analyzed in a gas chromatograph and the result is shown in FIG. 3. The data shown in FIG. 3 were obtained using a computer controlled Varian CP 3600 gas chromatograph equipped with a ASTM D2887 simulated distillation capillary column and a flame ionization detector (FID). While this material was a solid at room temperature (the ATB was a viscous liquid at room temp), its GC analysis was similar to the ATB in that kerosine through gas oil hydrocarbons were present (to about the same extent). Some heavier components appear as well. The main reason that the heavier component peaks are not larger is that this medium VTB is less soluble in dichloromethane ($CH_2Cl_2$) than ATB.

Figure 4:
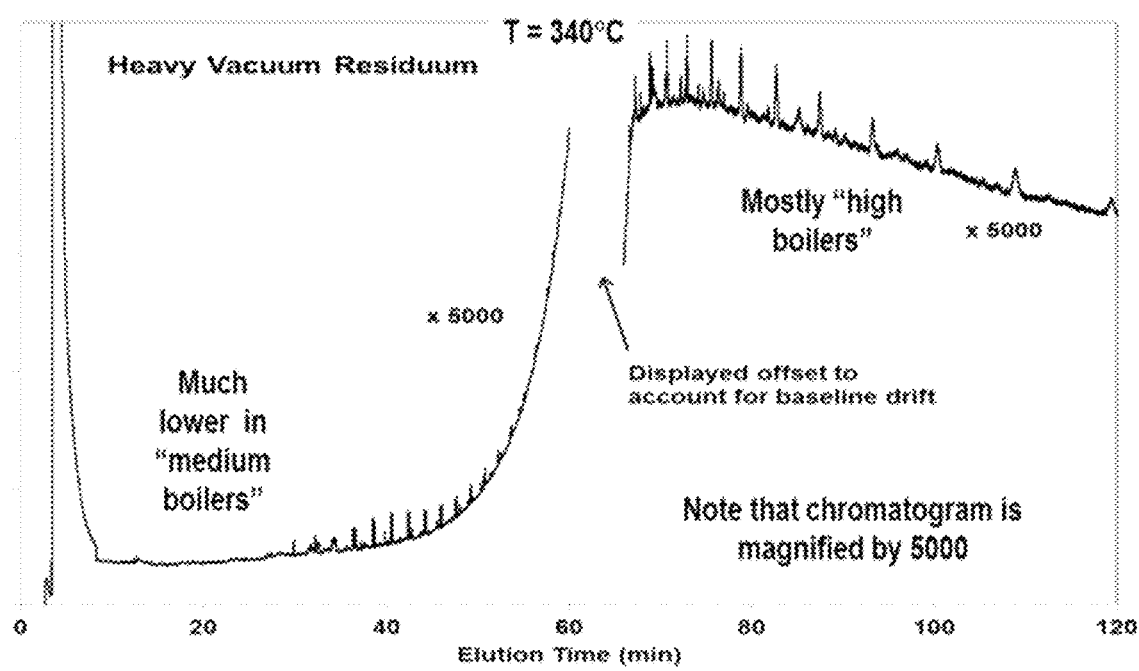
FIG. 4. Gas chromatogram of "heavy" vacuum residuum.

The heavy VTB is only slightly soluble in dichloromethane ($CH_2Cl_2$) so the peaks in the raw GC data are quite small (FIG. 4). Nevertheless, the qualitative comparison shows that this VTB is considerably heavier than the medium VTB and therefore contains greater amounts of high molecular weight hydrocarbons.

Because VTB is contains the highest boiling fractions of the original crude, all of the metals and much of the sulfur is concentrated in this material. Typical contaminant concentrations in vacuum residuum are: sulfur 2-7 wt %, nitrogen 0.2-0.7 wt % (mostly as heteroatom aromatics), oxygen ~1 wt % (phenols etc.), vanadium 100-1000 ppm and Ni 20-200 ppm.

Other examples of heavy oils should be understood by a Person Having Ordinary Skill in The Art.

The steam feedstock is comprised essentially of water vapor. The steam may be generated by a dedicated steam unit, waste steam from another unit operation, or waste heat recovered and used to at least partially heat the steam. The steam is injected into the reforming bed of the circulating fluidized bed reactor at about 865 to 870° C. and about 50 to 100 psig.

The fuel feedstock is added to the regeneration bed to promote the removal of coke and sulfur on the solid catalyst and solid alumina. The coke on the solids will act as one source of fuel (in combination with the added air) to combust the coke and remove the sulfur as sulfur dioxide or other sulfur oxides. There may not be enough coke on the solids to drive the combustion reaction and to heat the solids to about 900° C., so additional fuel feedstock is added. The fuel can be additional unprocessed heavy oil feedstock, petcoke or other suitable compounds that are understood by a Person Having Ordinary Skill in The Art.

The air feedstock is a compressed gas stream. Compress air or a mixture of oxygen, and nitrogen with other optional gases including carbon dioxide, or pure oxygen may be used as the air feedstock. The compressed air feedstock is at a pressure of about 50 to 100 psig and contains enough oxygen or to drive the combustion reaction in the regeneration bed.

The circulating fluidized bed may optionally be a looping reactor containing at least a fluidized reforming bed and a fluidized regeneration bed operably connected to each other by conduits for solids transport from the top of each bed to the bottom of the other. An example of a circulating fluidized bed reactor is shown in FIG. 1. The figures and drawings and the description of the figures and drawings should be understood by a Person Having Ordinary Skill in The Art as representing a class of reactors systems that can have varying configurations relative to the specific configuration in FIG. 1. The reforming bed has a heavy oil feedstock 10 and a steam feedstock 20. Heavy oil feedstock 10 is injected into the reforming bed 50 via an injector 52. Steam is added via a manifold 56. The solid mixture of a fluidizable nickel-containing reforming catalyst and a fluidizable alpha-alumina 70 is contained in the reactor and moves between both beds 50 and 60 via transporting conduits 54 and 64. A screen 57 supports the solids at the lower end of the reactor 50. The product gasses leave the reforming bed through exit 58. Solids are prevented from leaving by using an enlarged diameter disengaging zone 59 and a filter 53. The product gas stream 80 comprises a high-concentration hydrogen syngas, preferably where at least 25 vol % is hydrogen, and more preferably at least 60 vol % is hydrogen. Additional make-up solid catalyst and solid alumina 71 may be added to the transport conduit 54 via inlet valve 72. The regeneration bed 60 also contains a degassing zone 69 and an inlet 66 and an injector 62. In this bed the fuel feedstock 30 and air feedstock 40 are added to the regeneration bed. If the fuel is a solid, such as petcoke, and can be added with the solid make-up catalyst 71 via valve 72 or can be entrained as small particles in the air feedstock 40. The solid mixture 70 also fluidizes in the regeneration bed 60 and returns to the reforming bed 50 via conduit 64. The regeneration bed 60 contains an exit port and valve 74 where spent catalyst and solid alumina 73 can be removed. The product gas stream of the regenerator 90 exits via the exit port 68. A filter 63 and enlarged top section of the reactor 69 prevent solids from exiting with the gas stream.

The fluidized bed comprises a mixture of a fluidizable solid, preferably alpha-alumina and a fluidizable nickel-containing reforming catalyst. The alpha-alumina may have a particle size range from 60 to 225 um, or preferably from 60 to 90 um. The alpha-alumina may be produced in a spray drying process with a surface area of from 0.1 to 10 $m^2$/gram. Preferably the surface area may be from 0.25 to 8 $m^2$/gram, or about 0.25 or about 8 $m^2$/gram. The amount of silica contained in the alpha-alumina can be less than 3%, preferably less than 1%.

The nickel-containing reforming catalyst comprises a magnesium-aluminate support with nickel at a loading amount of 10 to 20 weight %, preferably 12 to 15 weight %. The particle size may be about 60 to 225 um, preferably about 106 to 225 um. The nickel-containing catalyst can be cycled from the Ni to the NiO form, reversibly.

In a preferred embodiment the nickel-containing catalyst may have a BET Multipoint Surface Area of about 1.47 $m^2$/g prior to using in the circulating fluidized bed and the catalyst can undergo physical changes in the circulating fluidized bed that increase the surface area to about 12.80 $m^2$/g. The nickel-containing catalyst used in examples 3, 4 and 5 had a surface area before and after use of about these values.

Figure 5:
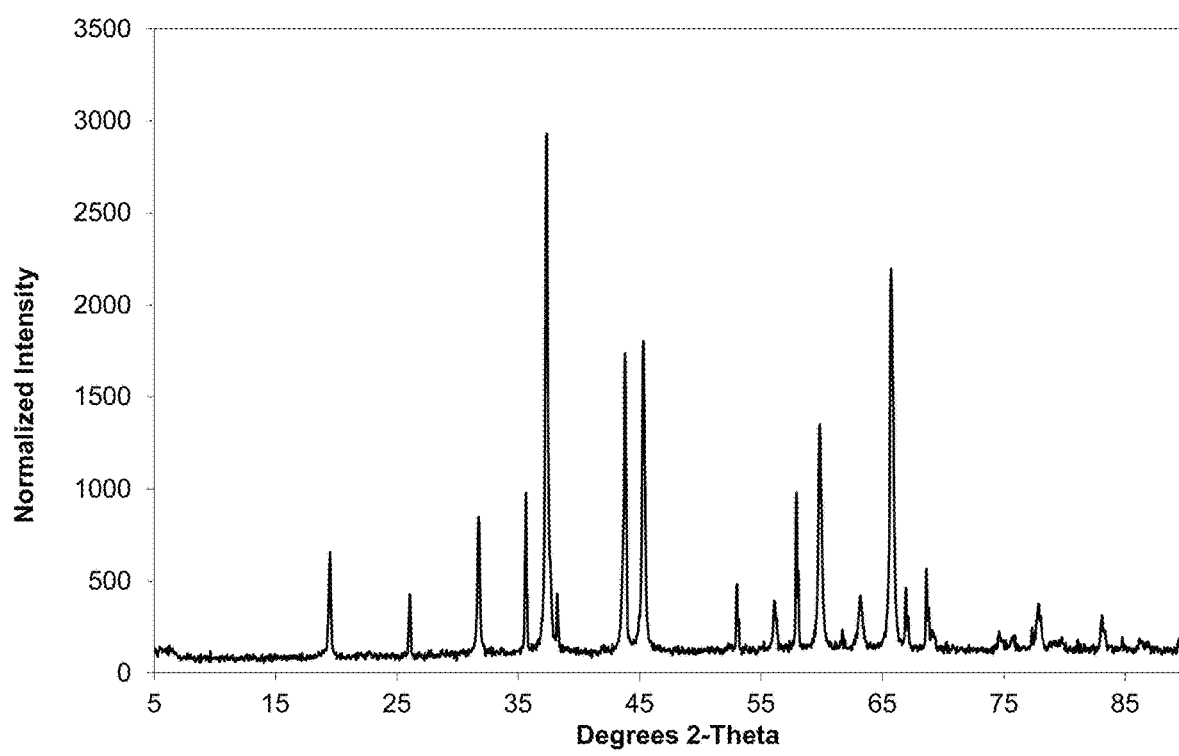
FIG. 5. XRD of an example of a nickel-containing reforming catalyst.

The nickel-containing catalyst may be analyzed using an X-ray diffractometer (XRD) to establish the presence of the magnesium-aluminate support and the deposited nickel in the oxide form. FIG. 5 shows an example of an XRD scan of a suitable example of the catalyst.

A feature of the alumina (or other solid) and catalyst is the particle size. The particles must be about 60 um up to about 225 um. Another feature is the nickel loading level, which may be about 10 to 20 weight %. These features combined with operating conditions discussed in the following sections (specifically, the residence time such that the product of the weight hourly space velocity (WHSV) and the time online equals from 0.001 to 10, preferably 0.01 to 1.64 and more preferably 0.01 to 0.25 in the reforming bed) form a set of elements of this invention that provide for a process that can generate hydrogen from heavy oil using a circulating fluidized bed reactor that can operate continuously for a period of time without suffering from coke, sulfur or other material build-up or catalyst deactivation. In addition the combination of these features allow for a heavy oil reforming process that does not require adding air or oxygen to the reforming bed, thus a product gas with a high level of hydrogen product is produced (at least 25 vol %, more preferably at least 60 vol %).

An embodiment of the invention is the resistance of the catalyst to attrition in both the reforming and regeneration beds due to particles colliding and abrading against each other when fluidized.

In an embodiment, heavy oil and steam are fed into a fluidized bed reactor containing a nickel steam reforming catalyst at 870° C. to generate syngas ($CO+H_2$). Because the process uses contact times such that the product of the weight hourly space velocity (WHSV) and the time online equals from 0.001 to 10, preferably 0.01 to 1.64 and more preferably 0.01 to 0.25, not enough carbon or sulfur build up on the catalyst to cause irreversible deactivation. The catalyst is then regenerated by burning the coke and sulfur off with air. In the laboratory, this may be done using a single reactor with a nitrogen purge between reforming and regeneration steps; however, in an industrial setting, a circulating fluidized bed system would be used. Burning off the coke and sulfur in the regenerator reheats the catalyst to about 900° C. for the next reforming step (a small amount of residuum, heavy oil or other fuel can be added to the regenerator to increase the temperature if there is not enough coke on the catalyst). The hot nickel catalyst returning to the reforming reactor is present as NiO but is quickly reduced to catalytically active nickel metal by the hydrocarbons in the feed.

The solid diluent, an example of which is alpha-alumina, provides added thermal capacity because of its mass and heat capacity and helps prevent irreversible coke buildup on the active nickel-containing catalyst surface by physically diluting it from about 25 to 75 weight percent. The thermal mass of alumina improves heat transfer. In an embodiment the nickel-containing catalyst makes up about 50 to 75 weight percent of the mixture and in a preferred embodiment the nickel-containing catalyst makes up about 75 weight percent of the mixture.

Petcoke (petroleum coke) can be used as the fuel feedstock. Conveniently, petcoke is a low-value material typically available in refineries. Solid fuel feedstocks such as petcoke may be added to the process with the make-up catalyst.

From the reforming reactor, the catalyst is sent to a regeneration bed, where coke and sulfur are burned off with air and the catalyst is reheated to about 900° C. (a small amount of fuel, such as heavy oil feed or petcoke is added as additional fuel). The catalyst returns to the reactor as inactive nickel oxide, but it is quickly reduced back to catalytically active Ni metal by the hydrocarbons in the feed.

Because the catalyst can reversibly shuttle between the reduced Ni state and the oxidized NiO state the physical passing of the solid mixture from the regeneration bed to the reforming bed and back has the effect of transporting oxygen from the regeneration bed (on the solid) to the reforming bed. This is important because air can be used for catalyst regeneration (instead of $O_2$ which requires an air separation plant) while keeping the syngas produced by the reformer from being diluted with nitrogen.

Examples 3-5 provide operating conditions that use a heavy oil feedstock and generate a syngas product with at least 60 volume present hydrogen on a dry gas basis, or after excess water has been condensed. In another embodiment the syngas product has a hydrogen to CO mole ratio of from 4 to 6. Example 7 provides operating conditions that use pyrolysis oil and generate a syngas product with at least 25 volume % hydrogen on a dry gas basis, or after excess water has been condensed. The hydrogen content is lower due to the presence of water in the pyrolysis oil feed.

Figure 6:
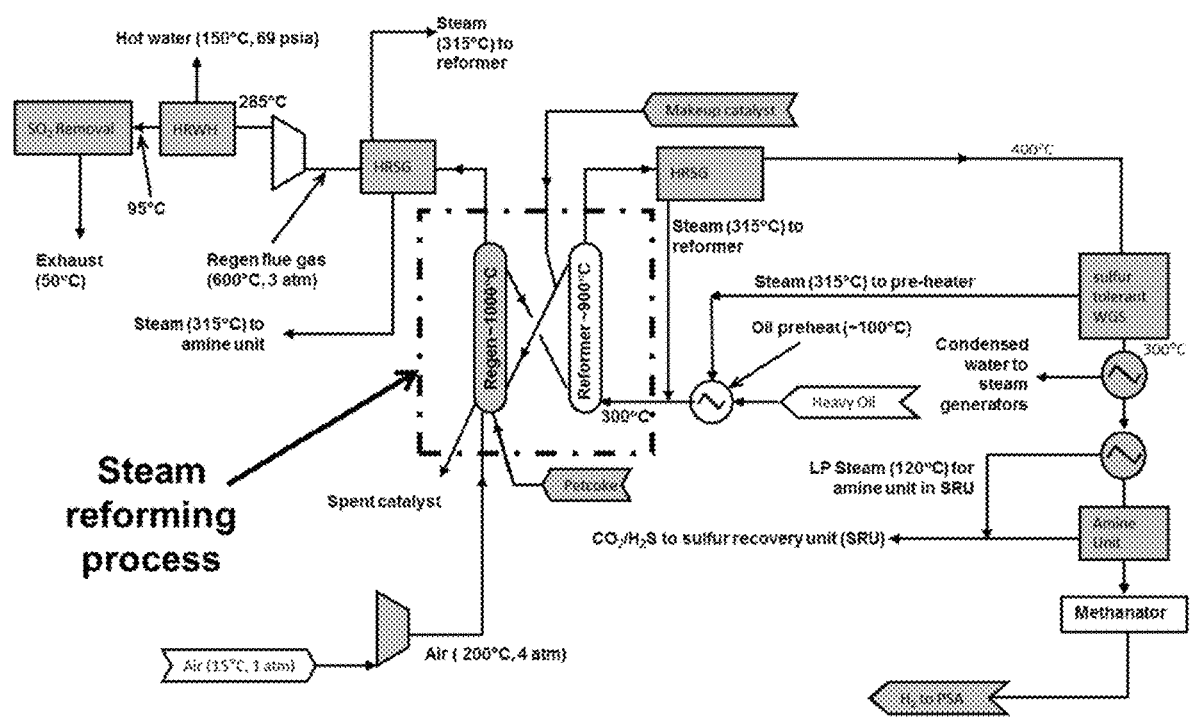
FIG. 6. Schematic of HyRes process as part of a steam reforming plant.

In one embodiment the steam to carbon molar ratio for the feedstocks in the reforming bed is from 1.75 to 5. In another embodiment it is from 3 to 5. The process can use heavy oil feedstocks including, but not limited to, atmospheric tower bottoms (ATB) and vacuum tower bottoms (VTB) as feedstocks, The process can steam reform heavy hydrocarbon fractions such as atmospheric and vacuum residuum (also called atmospheric tower bottoms, ATB and vacuum tower bottoms, VTB) over nickel based catalysts without catalyst deactivation (FIG. 6). The catalyst is not deactivated in the process because it is regenerated in air at regular intervals. In a circulating fluidized bed system, the catalyst is continuously regenerated. The catalyst is regenerated after about a period of time such that the product of the weight hourly space velocity (WHSV) and the time online equals from 0.001 to 10, preferably 0.01 to 1.64 and more preferably 0.01 to 0.25, for the reforming reaction.

Figure 7:
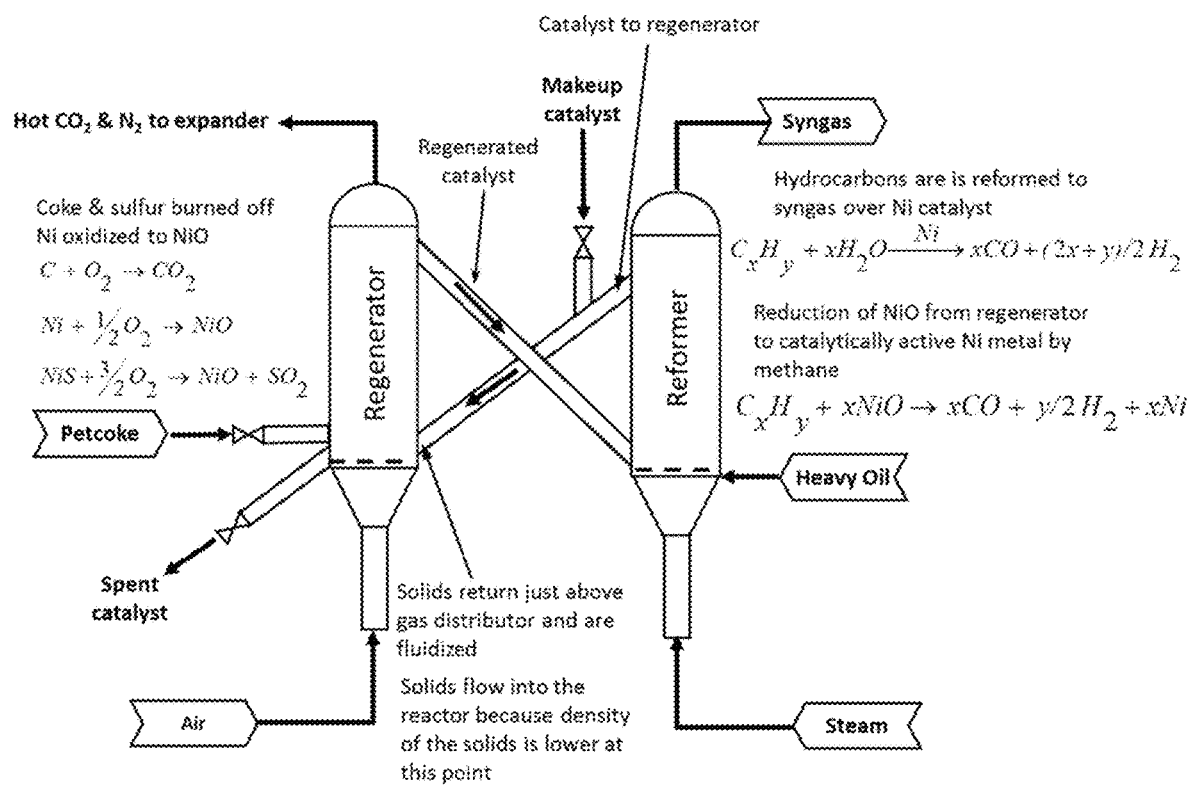
FIG. 7. Some of the reactions taking place in the HyRes process (not including water gas shift).

Heavy oil and steam are fed into a fluidized bed reactor containing a Ni steam reforming catalyst at about 865 to 870° C. to generate syngas (CO+H2). Because reforming is carried out for only a period of time such that the product of the weight hourly space velocity (WHSV) and the time online equals from 0.001 to 10, preferably 0.01 to 1.64 and more preferably 0.01 to 0.25 before the catalyst is regenerated, the amount of carbon (coke) and sulfur that build up on the catalyst surface are not sufficient to cause irreversible deactivation. The catalyst is then sent to a regenerator where the coke (and sulfur) are burned off with air. Combustion of coke on the catalyst surface ($C+O_2 \rightarrow CO_2$, $\Delta H=-94$ kcal/mole) and the oxidation of nickel on the catalyst to nickel oxide ($Ni+\frac{1}{2}O_2 \rightarrow NiO$, $\Delta H=-56$ kcal/mole) supply most of the heat required to increase the catalyst temperature back up to ~900° C. in the regenerator; however, additional heavy hydrocarbon feed (or petcoke) can be burned in the regenerator if needed to increase the catalyst temperature. The hot catalyst returning to the reforming reactor is now in the form of nickel oxide, which is catalytically inactive for steam reforming; however, in the process, the hydrocarbons in the feed quickly reduce the NiO back to catalytically active Ni for the next reforming cycle ($xNiO+C_xH_y \rightarrow xCO+y/2H_2+$ xNi). In an industrial sized unit (where heat losses are lower compared to the laboratory scale), the sensible heat in the catalyst and inert solids added will provide most of the endothermic heat required by the steam-hydrocarbon reforming reactions. The catalyst flow, feed, steam and regenerator fuel rates are adjusted to maintain the proper heat balance in the process. FIGS. 6 and 7 show examples of the heavy oil steam reforming process.

Figure 8:
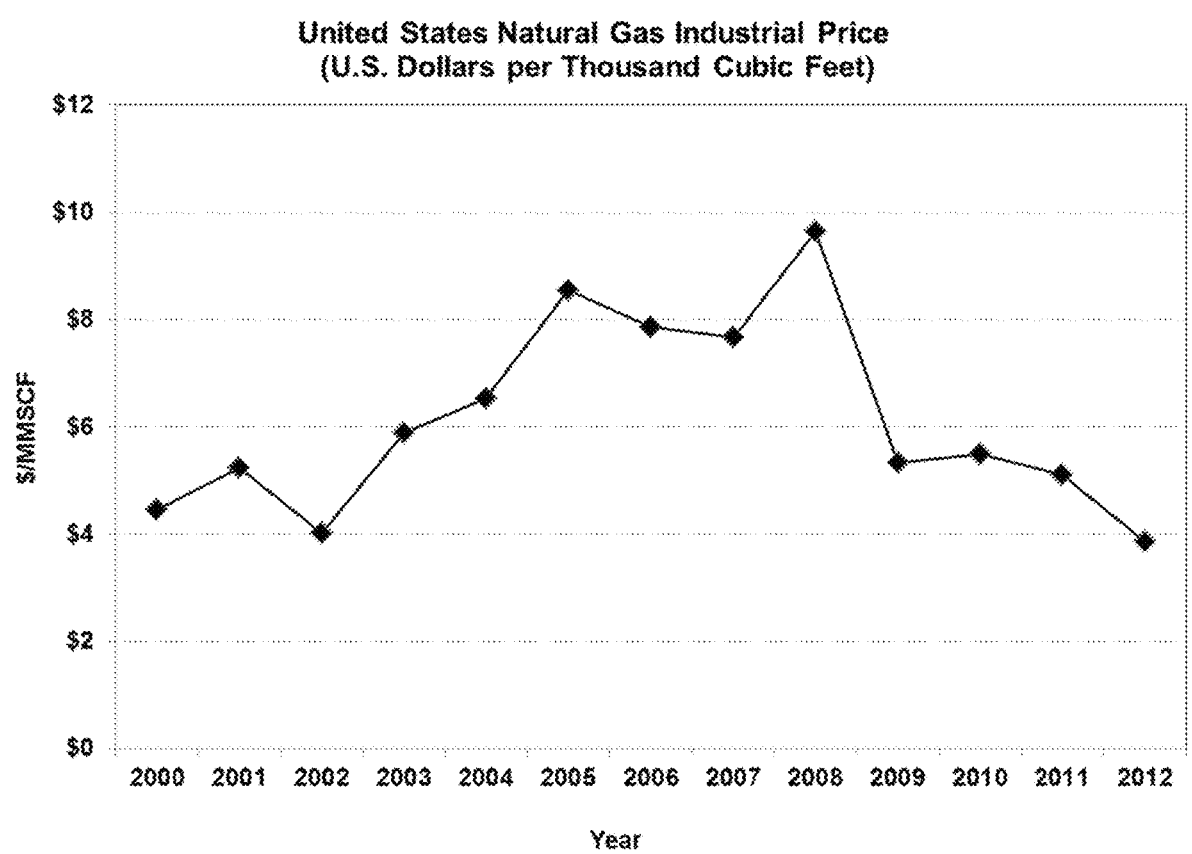
FIG. 8. Historical natural gas prices from 2000 to 2012.

The process has advantages described in the BACKGROUND section. There are additional advantages related to the process economics. The economics of hydrogen generation in refineries strongly depends on feedstock cost. The price of natural gas for industrial consumers is currently low (FIG. 8) making steam methane reforming (SMR) economically attractive for generating hydrogen. The selling price of "bottom of the barrel" products depends on the price of petcoke (steel making demands in China have recently pushed up petcoke prices), whether there is a market for heavy fuel oil made by cutting residuum with a lighter distillate fraction, and asphalt prices. Nevertheless, increasing gas prices or lack of steam methane reforming infrastructure (e.g. smaller refineries), make a hydrogen from heavy oil process more economically attractive.

Another area where a heavy oil reforming process is useful is for generating hydrogen for upgrading bitumen during syncrude production. Currently, one of the most common methods for syncrude production is to process raw oil sand bitumen in a coking unit, which converts about 40-50 weight percent of the carbon in the bitumen into coke. The remaining liquid syncrude is then piped to refineries. Because coking the bitumen removes what would otherwise be the bottoms fraction of the crude, the syncrude must be eventually blended with conventional petroleum so that it can be processed in existing refineries. By using bitumen to produce hydrogen it is possible to either reduce the amount of coking needed to produce syncrude by hydrotreating the bitumen directly, or upgrade syncrude produced by conventional methods before it enters the pipeline.

The heavy oil reforming process is less expensive than partial oxidation (PDX) or heavy oil gasification because it has the advantages of oxygen gasification without the need for an expensive oxygen plant, and the process temperature is much lower than those required by gasification (the heavy oil reforming process operates at about 865 to 900° C., whereas gasification operates at or greater than 1100° C.). Because the process uses a separate vessel for catalyst regeneration, no nitrogen is introduced into the syngas, which improves the efficiency of downstream water gas shift and hydrogen separation operations. Economic analysis indicates that the process can produce hydrogen for approximately $4-5 per 1000 SCF compared with about $5-9 per 1000 SCF from a small (0.5-10 MMSCFD) steam methane reforming plant, or purchasing delivered liquid hydrogen for about $9-28 per 1000 SCF.

As refineries process increasingly heavy, sour crudes (as well as the increased use of oil sand bitumen) more hydrogen will be required to remove metals, sulfur and nitrogen, and to upgrade highly aromatic feedstocks into distillate fuels. Most large refineries have delayed cokers that are used to convert bottom of the barrel streams into petroleum coke, naphtha and gas oils. Very few have petroleum coke gasifiers for generating hydrogen due to their extremely high cost. When the market for petcoke is good, coking can be economically attractive. In poor markets, petcoke may sell for less than a barrel of crude (on a carbon basis) and in that case coking is mostly a way to get rid of bottom of the barrel hydrocarbons (obviously, this is offset somewhat by the value of the naphtha and gas oils produced by the coker). Some refineries have steam methane reformers onsite, and some purchase $H_2$ from a vendor (e.g. Air Products, Praxair, et al.). Both large and small refineries can benefit from the present HyRes process, especially as an alternative to coking. For large refiners, HyRes is a way to increase $H_2$ capacity without installing additional steam methane reforming (SMR) or partial oxidation (PDX) capacity. For small refineries, (~50,000 bbl/day and smaller), the installation of SMR (let alone a heavy oil or petcoke gasifier) is economically unattractive. The HyRes process is particularly well suited for use in these smaller refineries. The estimated $H_2$ production costs for a 19 MMSCFD hydrogen plant based on HyRes is $11.40 per MMBtu (or $0.696 per LB), with a total plant capital cost of approximately $5 million. This is lower than the cost of a steam methane reformer plant of similar size, which is about $14/MMBtu, assuming natural gas at a cost of $5 per MCF.

In the above cost analysis of the HyRes process, all of the flows were balanced with heat losses in every component when the $H_2$ yield and fuel requirements were calculated. Using a cost of VTB in 2007 of $7/MMBTU, and including credits for power produced and $CH_4$ in the syngas. The cost of generating $H_2$ from natural gas is approximately $/MSCF of $H_2$=0.45*NG+1.02. Using this formula and natural gas at a cost of $5.50/MCF gives a $H_2$ production cost of $3.50/MSCF of $H_2$, or $10.75/MMBTU (in 2014$). $H_2$ from HYRES costs ~$11/MMBTU; thus, HyRes is economically competitive with natural gas even at low gas prices.

Another area where the HyRes process is useful is for generating hydrogen for upgrading oil sand bitumen during syncrude production. Currently, syncrude is made by coking raw oil sand bitumen, which converts about 40-50 wt % of the carbon in the bitumen into coke (not all of which is utilized). The liquid syncrude is then piped to refineries. Because coking the bitumen removes what would otherwise be the bottoms fraction of the crude, the syncrude is blended with conventional petroleum so that it can be processed in existing refineries (that were designed for processing conventional petroleum). The HyRes process is suitable for using dilbit (30% condensate+70% raw oil sand bitumen to produce hydrogen for long operating periods with no catalyst deactivation. By using bitumen to produce hydrogen, it may be possible to either reduce the amount of coking needed to produce syncrude by hydrotreating the bitumen directly, or upgrade syncrude produced by conventional methods before it enters the pipeline.

Finally, the main reason that our residuum steam reforming process is less expensive than partial oxidation (PDX) or heavy oil gasification is that the HyRes process has the advantages of oxygen gasification without the need for an expensive oxygen plant, and that the feedstock can be easily handled and steam reformed at temperatures much lower than those required by gasification (the present process operates at about 1562° F. (850° C.), whereas gasification operates at temperature of 2192-2642° F. (1200-1450° C.) (Rezaiyan and Cheremisinoff 2005). Because HyRes uses a separate vessel, or optionally the same vessel used in a separate process step, for catalyst regeneration, no nitrogen is introduced into the syngas, which improves the efficiency of downstream water gas shift and hydrogen separation operations. An economic analysis indicates that HyRes can produce hydrogen for approximately $4-5/1000 SCF using our process compared with ~$5-9/1000 SCF from a small (0.5-10 MMSCFD) steam methane reforming plant, or purchasing delivered liquid hydrogen for ~$9-28/1000 SCF.

Other examples of commercial catalysts designed for heavier feedstocks include the Haldor Topsøse catalysts such as AR-401, a naphtha pre-steam reforming catalyst containing 35% Ni on $MgAl_2O_4$, AR-301 (30% Ni on $MgAl_2O_4$), and RKNGR (25% Ni, 11% $Al_2O_3$, balance MgO).

Example 1: Preparing the Nickel-Containing Catalyst from a Commercially Available Reforming Catalyst A commercial steam reforming catalyst such as Haldor Topsøse R-67-7H (<12% Ni/$MgAl_2O_4$ is ground and screened to a particle size of −250 to +106 mesh. Approximately 375 grams of this catalyst is then mixed with 125 grams of alpha-alumina (Saint Gobain NorPro SA5397) that was ground and screened to the same particle size. The densities of the Ni catalyst and alpha alumina are close enough that the same particle size can be used in the fluidized bed reactor (i.e. the particles have minimum fluidization velocities that are essentially identical). Other commercial Ni catalysts designed for hydrocarbon steam can be used with and without promoters. A non-exhaustive list of examples of promoters used in commercial Ni steam reforming catalysts include MgO, CaO, and lanthanum, cerium and lanthanide group elements. Alkali metals (notably potassium) are sometimes added to improve the coking resistance of the catalyst.

Example 2: Preparing a Nickel-Containing Catalyst

Ni steam reforming catalysts are typically made using a coprecipitation technique. Impregnation is not commonly used because the resulting catalysts are not strong enough for use in the tall (ca. 20 m) commercial fixed bed steam reformer tubes. Other metals such as Pt, Ru and Pd are also active for steam reforming of hydrocarbons but are cost prohibitive. This is because the high operating temperatures used in catalytic hydrocarbon steam reforming sinter the catalyst so that only 5-10% of the metal in the catalyst is actually exposed at the surface for catalysis. As a result, essentially all hydrocarbon steam reforming catalysts use nickel.

Preparation of a Ni catalyst by coprecipitation: Nickel nitrate ($Ni(NO_3)_2$) sufficient to obtain the desired wt % Ni (10 to 20 wt %) in the final catalyst is dissolved in distilled water. Aluminum nitrate ($Al(NO_3)_3$) is then dissolved in the same solution, and if desired, magnesium or calcium nitrates, lanthanide nitrates, etc. can added as modifiers. Magnesium and calcium are added to form Mg and Ca aluminates which are hard, dense spinel phases that greatly increase the mechanical durability of the catalyst. Sufficient base ($NH_4OH$, KOH or NaOH) is then added to co-precipitate nickel, aluminum and calcium or magnesium as their hydroxides. The precipitate is then washed free of ammonium (or Na or K) ions and allowed to age. The gel is then dried at approximately 120° C. overnight and then calcined at 500° C. overnight, followed by a high temperature calcining (800° C.) for several hours. The catalyst is then ground and sieved to the appropriate size for use in the fluidized bed reactors.

Preparation of $\alpha$ $Al_2O_3$: Alpha alumina is made in a similar fashion; aluminum hydroxide ($Al(OH)_3$) is precipitated from an aluminum nitrate solution using base followed by washing, drying and calcining. A final calcining at approximately 1100° C. is required to ensure that the alpha phase of aluminum oxide if formed. The alpha phase is used because it is the most stable high temperature phase of alumina, and having a closest-packed structure of aluminum and oxide ions is dense and mechanically durable.

Figure 9:
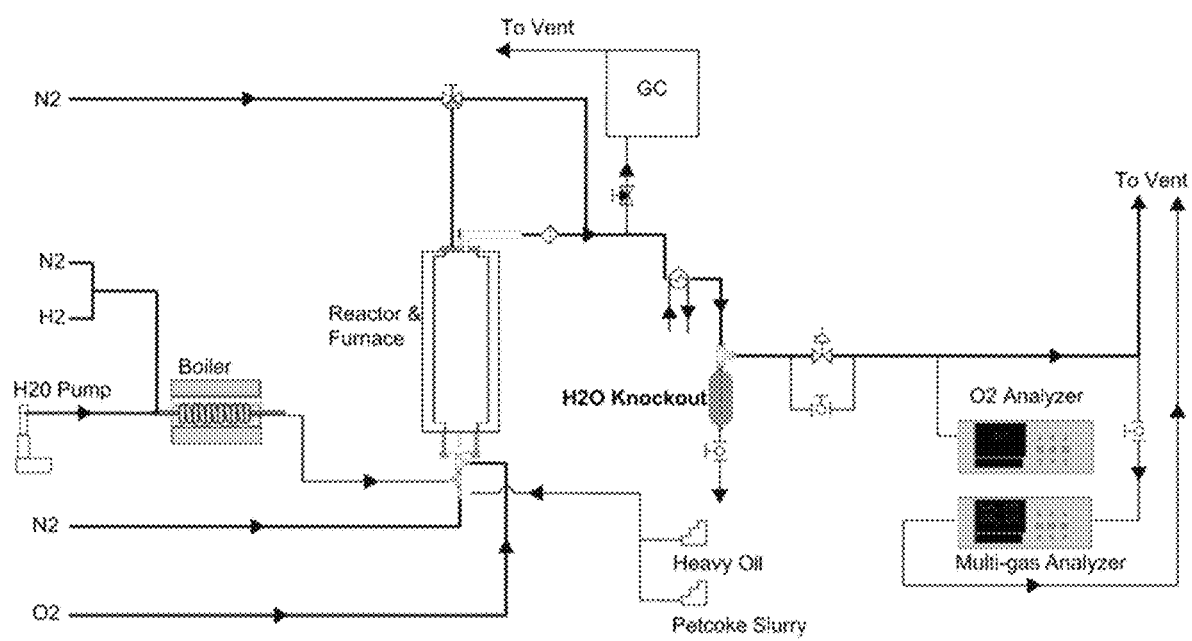
FIG. 9. P&ID for experimental test apparatus used in the examples.

Examples 3-10 use the following laboratory fluidized bed reactor. Experiments used the apparatus shown in FIG. 9. The apparatus uses a single fluidized bed, which is cycled between reforming and regeneration. The reactor is briefly purged with nitrogen between steps to prevent mixing air with heavy oil/syngas. Electronic mass flow controllers are used to feed five gas streams to the reactor via ¼"-316 stainless steel tubing. Each gas stream can be isolated by pneumatically actuated valves. There is also a high pressure liquid pump (ISCO stainless steel "syringe pump") that is used to feed water to a boiler (a tubing coil in a furnace) where it is vaporized into steam. A second ISCO high pressure liquid pump is used to feed heavy oil to a hot-water-jacketed injector where a nitrogen sweep aids in oil delivery. The oil pump has a heated jacket filled with silicone oil at 70-90° C. that is circulated by a heated oil bath to keep the viscosity of the heavy oil low enough that it can be pumped.

Due to the high steam reforming temperatures used (800-900° C.), the fluidized bed reactor is made from SCH40 Incoloy 800H pipe. A section of 4" pipe is used as a "disengaging zone", which is welded to a 4"×2" bell reducer that is attached to a section of 2" pipe that contains the catalyst bed. The catalyst bed contains about 500 g of a mixture of Ni steam reforming catalyst and fluidizable $\alpha$ $Al_2O_3$. Downstream from the reactor, a 10 µm filter collects any catalyst dust that is entrained in the gas flow, a heat exchanger/condensing coil to remove water, and a sodium citrate bubbler/scrubber to prevent H2S (during reforming) and $SO_2$ (during regeneration) from entering (and possibly damaging) the online $H_2$, CO, $CO_2$, $CH_4$ gas analyzer (Nova Analytical Systems). There is also a separate online paramagnetic $O_2$ analyzer. The system pressure is controlled using a computer-controlled, pressure control valve (PCV) made by Badger Meter Co. A PC running OPTO22 software controls the PCV as well as the heating tapes, tube furnace, mass flow controllers and other components of the system, as well as logs the data and monitors the system so that in the event of a malfunction, can safely shut down the apparatus.

The gas flow rates were determined by first measuring the minimum fluidization velocity of the catalyst particles in a cold flow apparatus using air. The minimum fluidization velocity ($U_{mf}$) is where the bed of particles just begins to bubble when gas is passed through a distributor up through the bed. A convenient way to do this is to plot the differential pressure drop across the bed of particles versus the superficial gas velocity up through the bed. At low flows, the particles don't move and the pressure drop is linear (fixed bed behavior). Increasing the gas flow expands the bed until incipient fluidization starts at $U_{mf}$. At this point the drag forces of the rising gas on the particles is just balanced with gravitational forces, so $U_{mf}$ is close to the terminal velocity of the particles. For quietly bubbling bed operation, typically 2-5 $U_{mf}$ is chosen as the operating gas velocity.

If the pressure is then decreased, there is a hysteresis in the pressure versus flow plot because the bed had been expanded so the pressure drop is slightly less for a given gas velocity. Above $U_{mf}$ the curve is fairly flat and the bed quietly bubbles until the gas velocity reaches a point where entrainment of the particles becomes evident. At this point, the gas velocity is greater than the terminal velocity of the particles and they are ejected from the bed. This generally occurs at around 20 or more times $U_{mf}$.

Because the particle sizes of crushed solids are typically not uniform, depending on the particle size distribution, obtaining fluidization with the larger particles, may necessarily put some of the small particles in entrained flow. Thus it is preferable to have a larger section of pipe above the main reactor section as shown in 1, FIG. 19 and FIG. 20. In the apparatus used in Examples 3-10, the main reactor is made from 2 inch SCH40 Incoloy 800H pipe that is about 18 inches tall. Welded to this is a conical adapter (so that catalyst does not hang up when descending) to which a 4 inch pipe section about 8.5 inches long is attached. Since the cross sectional area of the pipe varies with the square of the diameter, the area of the 4 inch section is about 4 times larger than that of the 2 inch reactor section so the gas velocity drops to 25% of its value in the 2 inch reactor section, and this allows any of the smaller particles to slow down and drop back into the reactor. Extremely fine material that still remains entrained is trapped by filters. An embodiment of this invention is the use of an attrition resistant catalyst and solid diluent and the screening of the catalyst and solid to remove fines at the start of a run, the amount of fines that must be trapped by the filters is minimized.

The Ergun Equation:

$$\frac{1.75}{\phi_s \varepsilon_{mf}^3}\left(\frac{d_p U_{mf} \rho_g}{\mu_g}\right)^2 + \frac{150(1-\varepsilon_{mf})}{\phi_s^2 \varepsilon_{mf}^3}\left(\frac{d_p U_{mf} \rho_g}{\mu_g}\right) = \frac{d_p^3 \rho_g (\rho_s - \rho_g) g}{\mu_g^2}$$

The Ergun Equation can be used to calculate the pressure drop. This classic correlation is quadratic in the particle Reynolds number, $N_{Re}=(d_p U_{mf} \rho_g)/\mu_g$ and, when solved for $N_{Re}$, the minimum fluidization velocity can be calculated. The implicit assumption for this equation is that the particle size is uniform. However if the particle size is known ($d_p$), along with the void fraction at $U_{mf}(\varepsilon_{mf})$, their sphericity ($\phi_s$), the viscosity and density of the gas ($\mu_g$ and $\rho_g$), and the density of the particles ($\rho_s$), $U_{mf}$ can be found. Experimentally, most of these values are usually not known exactly (especially $\phi_s$ and $\varepsilon_{mf}$) and measuring them is tedious. Also, a perfectly uniform particle size is undesirable and a small fraction of smaller particles improves fluidization. A preferred way to determine $U_{mf}$ is cold flow testing with air at room temperature and pressure. Once $U_{mf}$ is known under these conditions, either $\phi_s$ or $\varepsilon_{mf}$ can be used as adjustable parameters to make the data fit with air, and then these values can be used to calculate $U_{mf}$ with the gas of interest (in our case steam) at 850° C. and 50 psig, as exemplary conditions selected from the range of conditions described in the examples of this application.

Figure 18:
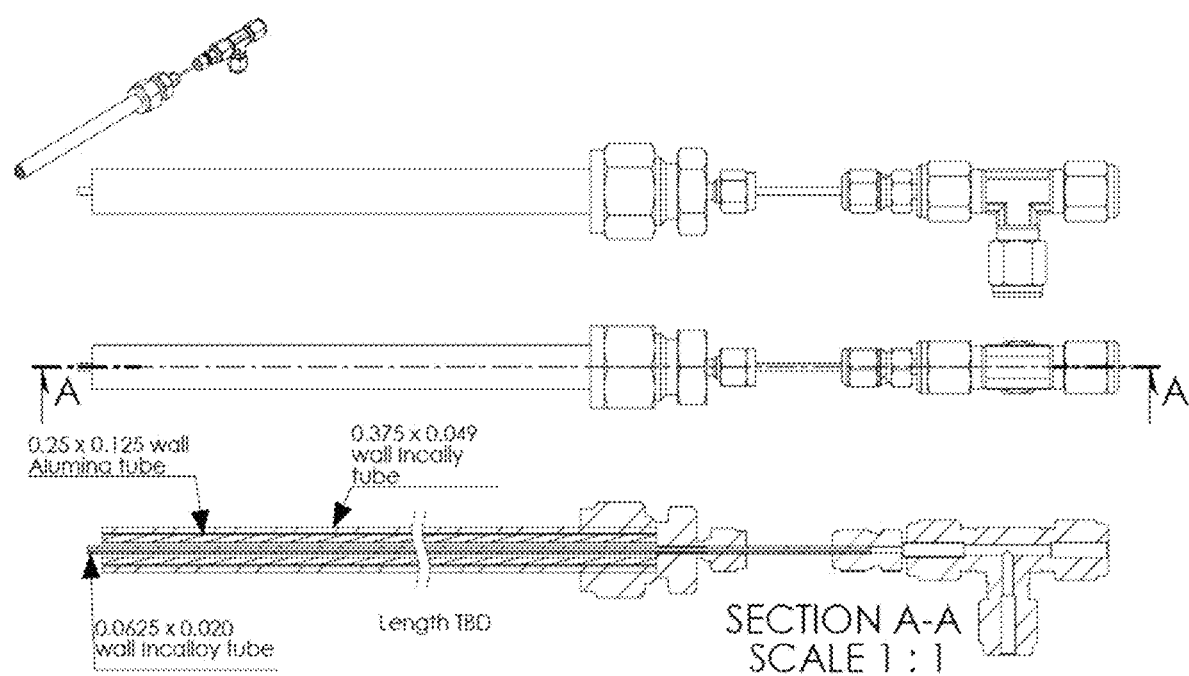
FIG. 18. Details of the heavy oil injector.

FIG. 18 shows the details of a heavy oil injector of the present invention. The central problem with feeding heavy oil is that it cannot be vaporized at ambient or higher pressures by heating alone without thermal decomposition. As a result, it is injected into the reactor as an aerosol of fine droplets. For the apparatus used in Examples 3-10, penetrating the wall of the reactor just above the fritted disk is a 0.5"×0.049" wall stainless steel tube. Inside of this is an alumina tube that acts as a thermal insulator for a thin (1/16$^{th}$ inch OD) tube inside it. Heavy oil is injected through this 1/16$^{th}$ inch tube. The small diameter ensures high velocity to minimize the residence time of the oil in the tube to prevent coking. The heavy oil is fed to the injector using an ISCO syringe pump.

The experimental apparatus is a bubbling fluidized bed reactor for the single bed tests. The same bed is used for reforming and regeneration in alternating steps. The reactor optionally use a variety of feedstocks including heavy oil, petroleum coke or mixture thereof.

Figure 19:
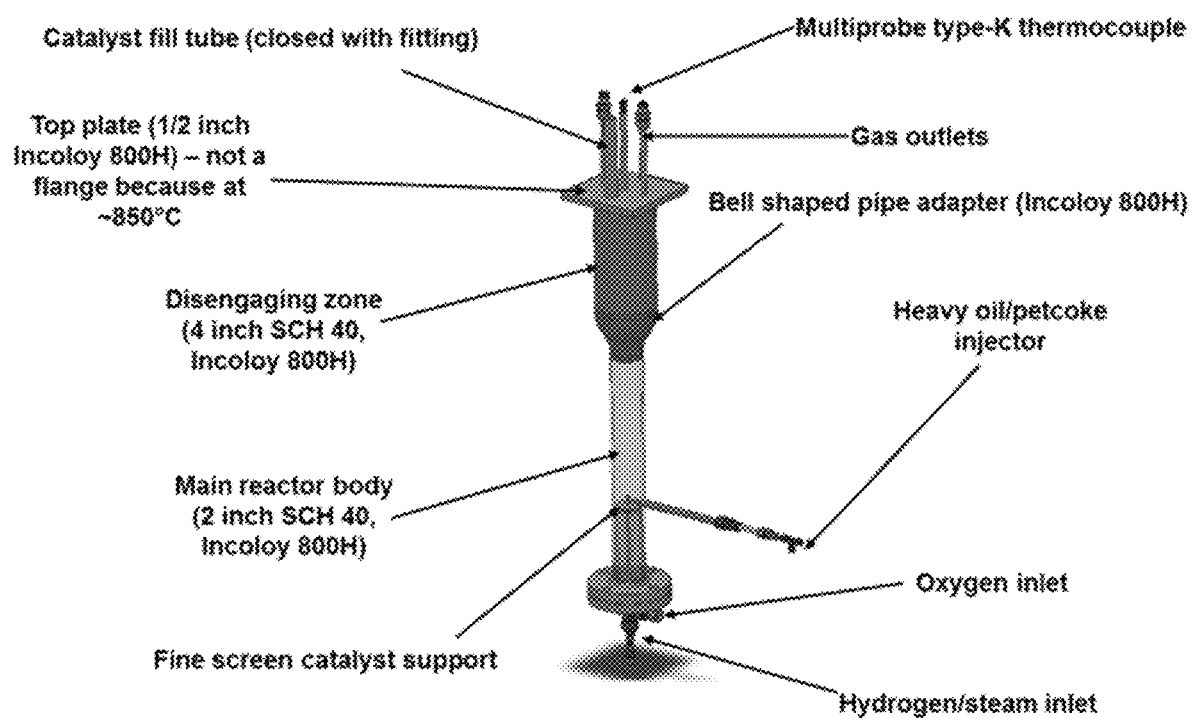
FIG. 19. External view of the reactor used in the examples.

FIG. 19 is a 3D rendering of the reactor. The reactor is made from Incoloy 800H for added strength at elevated temperatures. The bottom section of the reactor is made from 2 inch schedule 40 pipe (2.375 in O.D.×0.145 in wall) which is connected to a section of 4 inch schedule 40 pipe (4.5 in O.D.×0.237 in wall) that acts as a disengaging zone. A flat, 800H plate is welded on top of the 4 inch pipe that has ports for thermocouples, gas out and catalyst filling. These pipes/tubing are welded to the plate and extended out of the hottest zone of the reactor so that stainless steel fittings can be used for their attachments without fear of seizing (oxidation of the internal surfaces of the fittings in air at high temperatures can make them impossible to disassemble).

Figure 20:
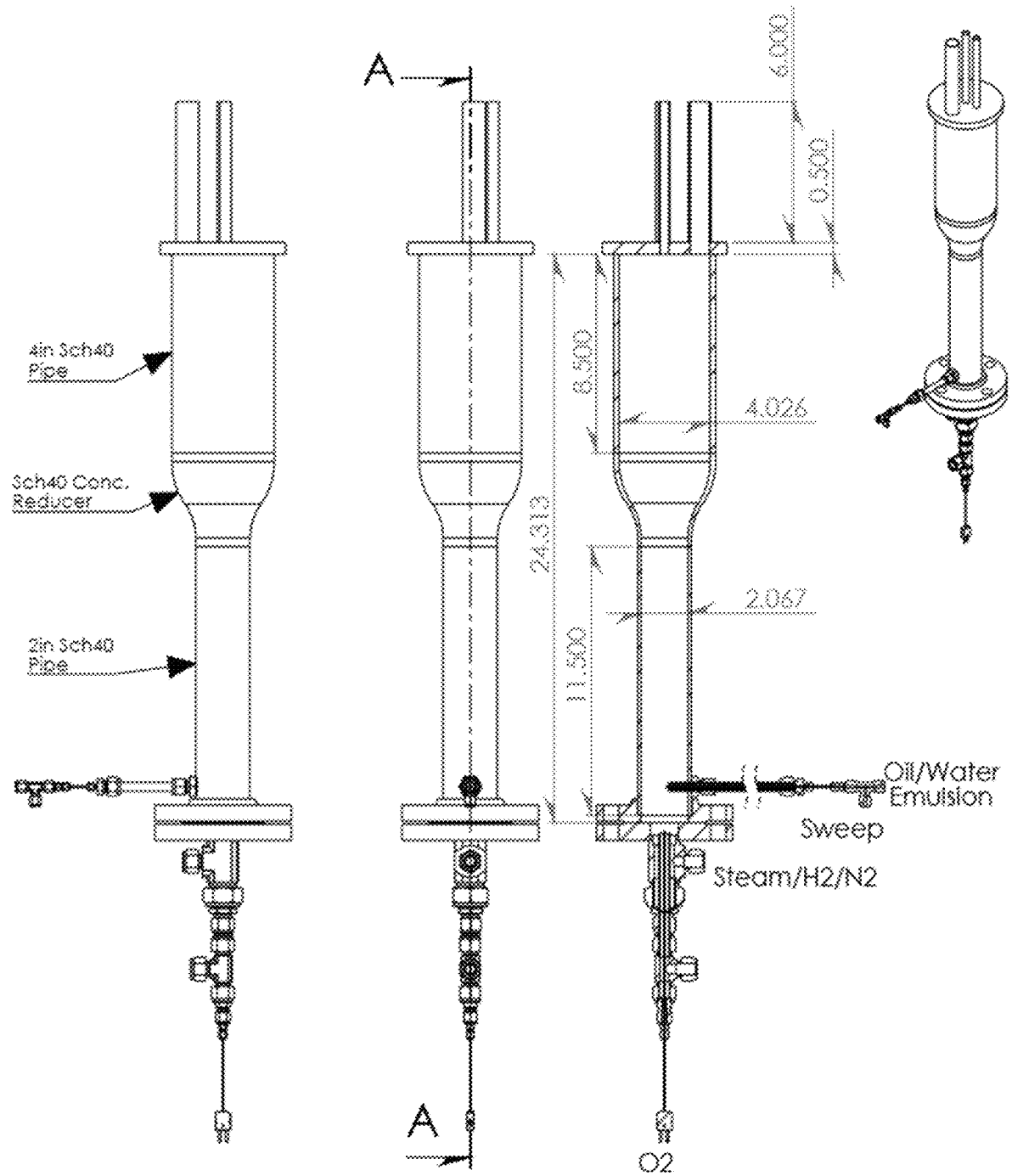
FIG. 20. Details of the experimental incoloy 880H fluidized bed reactor.
Figure 21:
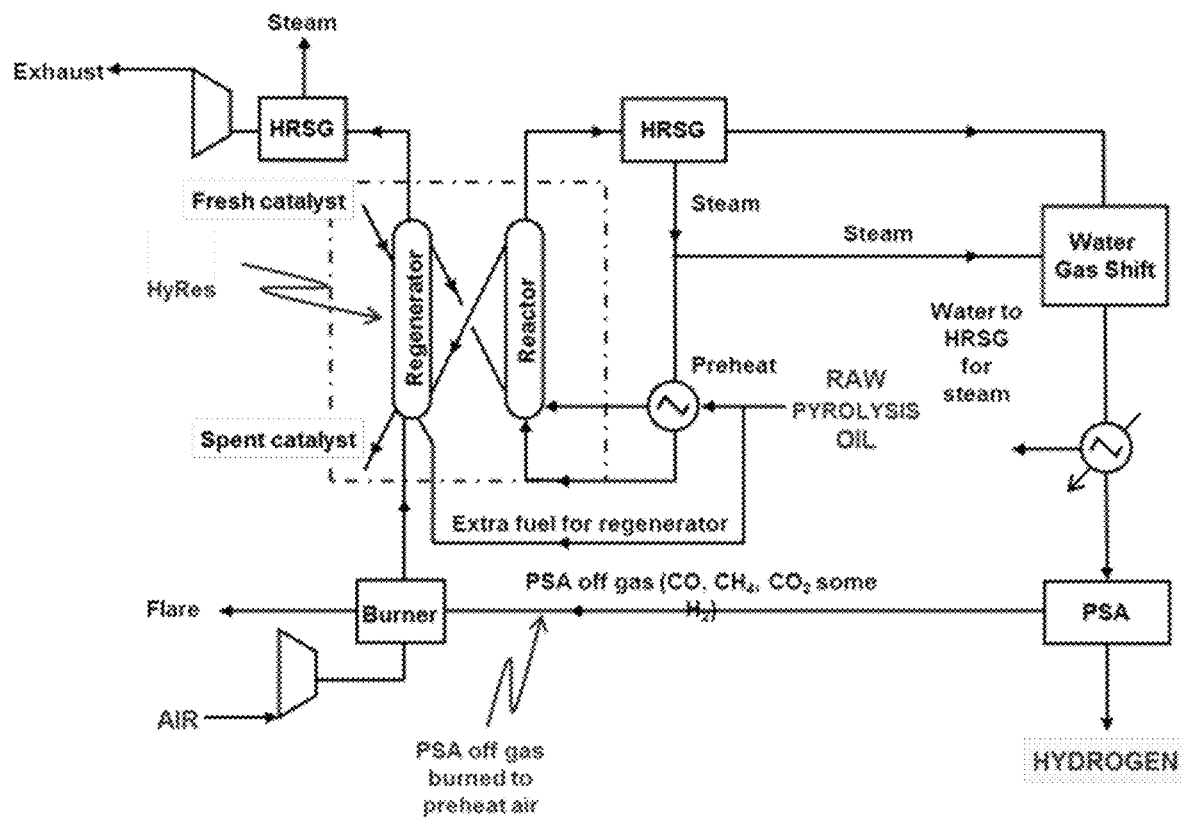
FIG. 21. Overall process diagram for using the HyRes process to generate hydrogen from biomass fast pyrolysis oil.

FIG. 20 shows details of the reactor. The main section of the reactor is made from 2 inch SCH40 Incoloy 800H pipe. It has an inlet nozzle for feeding heavy oil that is located approximately 6 inches up from the top of the bottom flange. Details of the inlet are shown in The reason that the inlet is so far up the main body of the reactor is that in order to keep the catalyst in the hottest zone of the tube furnace that encloses the reactor, there must be a screen located about 6 inches up from the bottom flange that must protrude from the bottom of the furnace in order to remain relatively cool. This prevents the bolts from seizing and also permits the use of 316 stainless steel Swagelok fittings for attaching gas lines (stainless steel is not well suited for operation at temperatures much above 500° C.). The reactor has a very large surface area to volume ratio, making heat losses relatively large. Therefore, the main function of the tube furnace is to act as a guard heater. Also, to keep the catalyst bed at 700-900° C. there is a small hydrogen/oxygen burner located at the bottom of the flange. Hydrogen is mixed with steam or nitrogen and fed into the side of the flange. Oxygen is fed from the bottom. Only enough $O_2$ to burn the $H_2$ to generate heat is added; none of the oxygen is used for gasification. This is a way to provide heat to the reactor.

The catalyst and solid diluent are in the form of irregular particles between about 63 and 106 or alternatively 63 to 225 um, or alternatively still 106 to 225 um in size. (For example, 63 to 106 um is −140 to +230 mesh). These solids are held on a small Inconel 600 frit that is supported on a small cylinder inside the main reactor body. When the reactor is assembled, the annular space between the catalyst/solid support cylinder and the inner wall of the 2 inch SCH40 pipe reactor body is packed with high temperature alumina felt. This configuration keeps the catalyst in the hot zone of the reactor and out of the annulus. The feed enters through the inlet nozzle.

In examples 3-10 the gas stream product from the reforming step is analyzed for $H_2$, CO, $CO_2$, $O_2$ and hydrocarbons. The values presented in the examples below and in the attached figures and the listing of the claims refer to the composition of on a dry gas basis, or after excess water has been condensed.

Example 3, Tests with Atmospheric Tower Bottoms

The experiments were run with Ni catalyst concentrations of 25%, 50% and 75% (by weight) diluted with fluidizable α $Al_2O_3$. The steam to carbon ratios were varied between 1.5 and 13.6. Reforming and regeneration were done at 865° C. and 900° C. respectively at a total system pressure of 50 psig. Reforming lasts about 90-120 minutes, and regeneration lasts about 40-60 min, so one cycle is about 3 hours long (e.g. ~25 cycles in ~80 hours).

Figure 10:
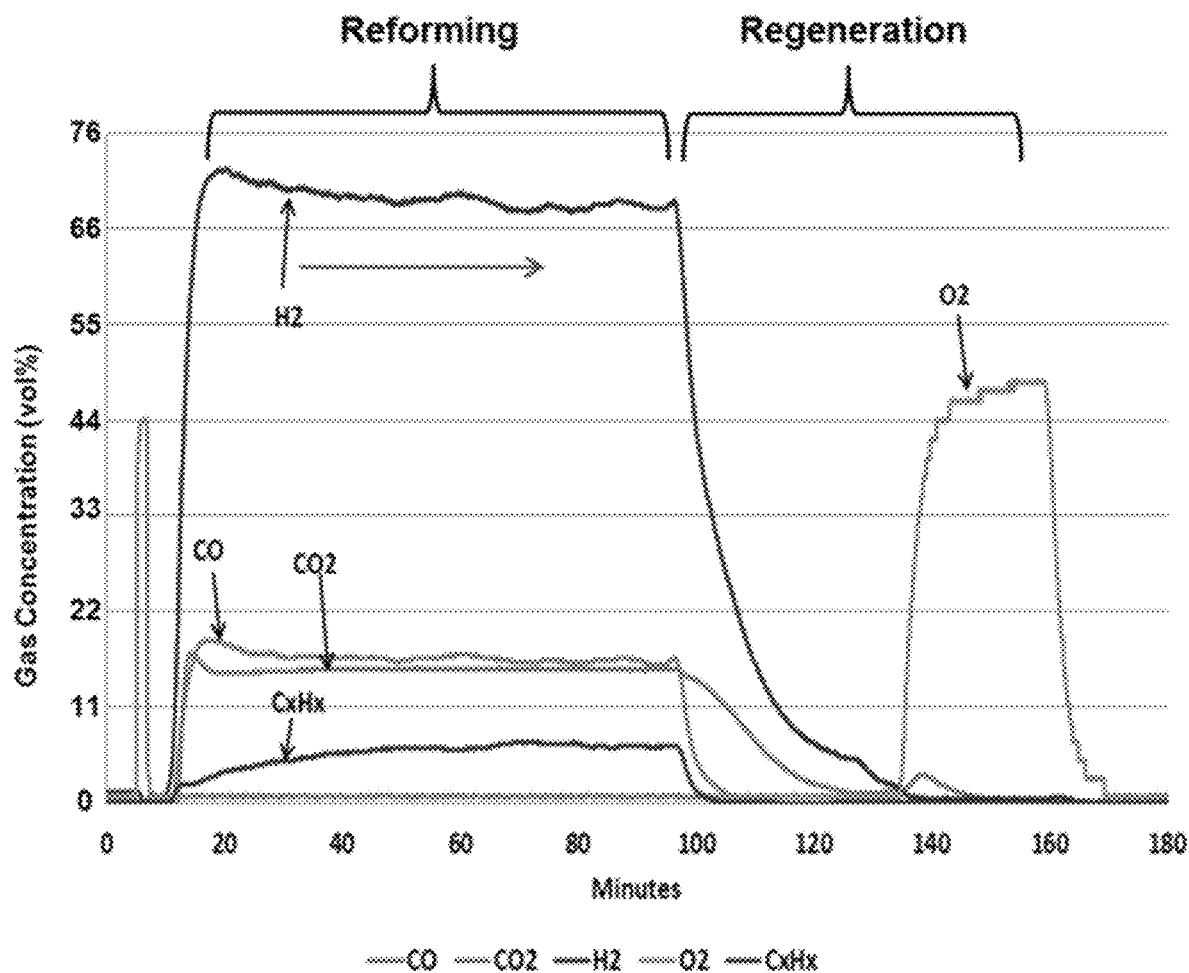
FIG. 10. Single cycle of ATB reforming with S/C=3 using 25 wt % Ni catalyst/75 wt % α $Al_2O_3$ at 50 psig and 865° C.

FIG. 10 shows the product gas composition measured using the online gas analyzer for a single steam reforming and regeneration cycle using atmospheric tower bottoms (ATB). In all cases the carbon balances were 85-95% by mass within experimental error. The steam reforming ATB does not require excessively high S/C ratios. The preferred steam/carbon ratio for ATB is about 3 and for VTB was about 5.

Figure 11:
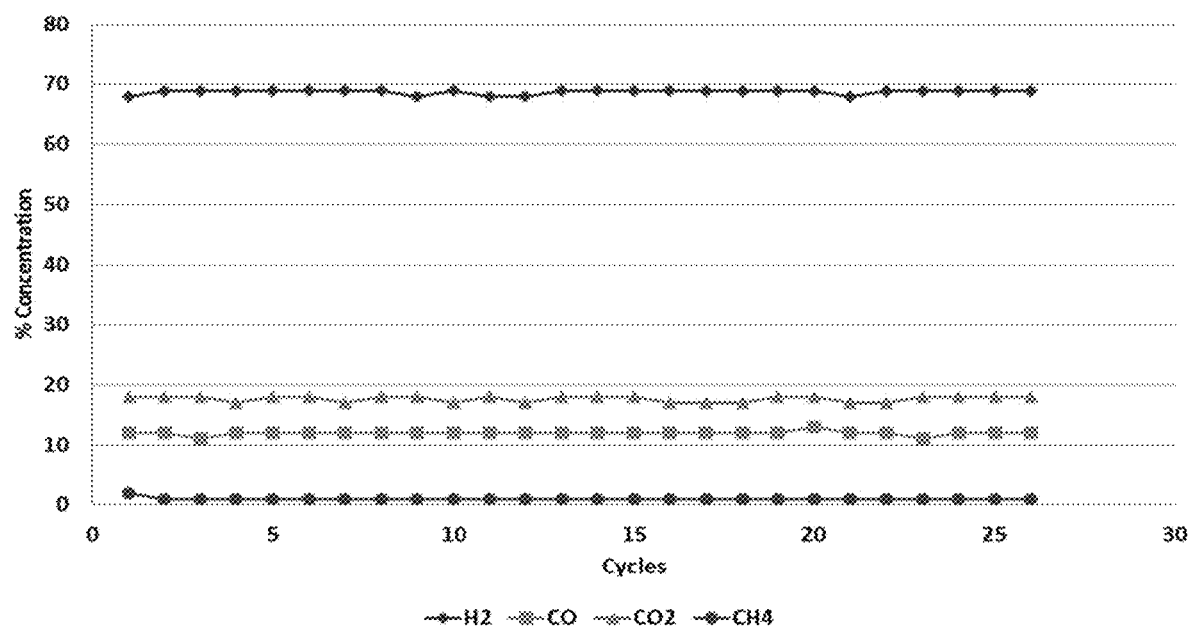
FIG. 11. Gas composition for steam reforming ATB at 865° C., 50 psig, S/C=5, 75 wt % Ni catalyst/25 wt % α $Al_2O_3$.

FIG. 11 shows the results for approximately 30 hours of cycling between steam reforming and regeneration using 75 wt % Ni catalyst/25 wt % α $Al_2O_3$ with S/C=5, at 865° C. and 50 psig. 500 g of the catalyst/diluent mixture (106 to 250 um) were used. ATB was feed to the reactor at 0.408 mL/min, or a WHSV of 0.0367 $hr^{-1}$, for about 90 to 120 minutes. Because $H_2$ returns to the same level with each cycle, there was no catalyst deactivation over the course of the test (26 cycles). If catalyst deactivation were occurring, there would be downward trend with time on stream as less and less hydrogen was produced during each cycle. The concentration of hydrogen in the gas remained relatively constant at 70-75 vol %.

Example 4, Tests with "Medium" Vacuum Residuum

Figure 12:
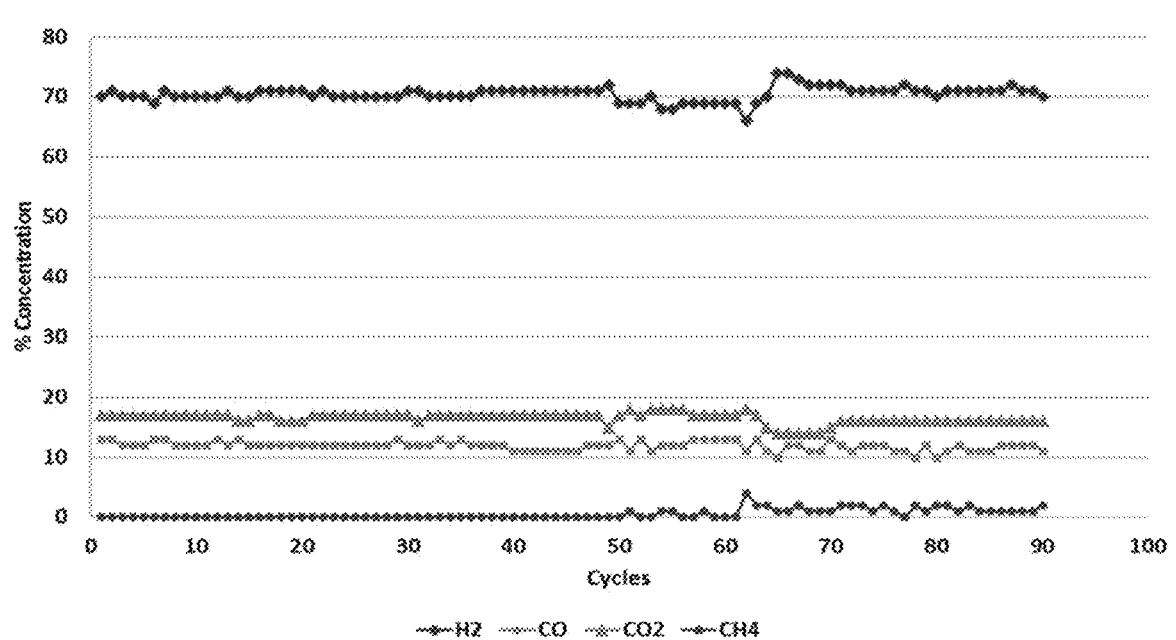
FIG. 12. Gas composition when steam reforming "medium" VTB at 865° C., 50 psig, S/C=5, 75 wt % Ni catalyst/25 wt % α $Al_2O_3$.

FIG. 12 shows the results of 90 steam reforming-regeneration cycles (280 hours) with the medium VTB. Reforming and regeneration were operated at T=865° C. (1589° F.), P=50 psig, Steam/carbon=5. The product of WHSV and time was 0.01 to 0.25, which is dimensionless. As before $H_2$=~70 vol % and there was no evidence of catalyst deactivation As was the case with the ATB, no deactivation of the Ni catalyst was observed over the course of the 150 hours indicating that coke and sulfur deposited on the catalyst were burned off in the regenerator, and that any metals (e.g. Ni and V) deposited on the catalyst had no measurable effect; Ni and V are the most common metal contaminants found in heavy petroleum fractions. As before, the hydrogen concentration was about 70 volume %.

Example 5, Tests with "Heavy" Vacuum Residuum

Figure 13:
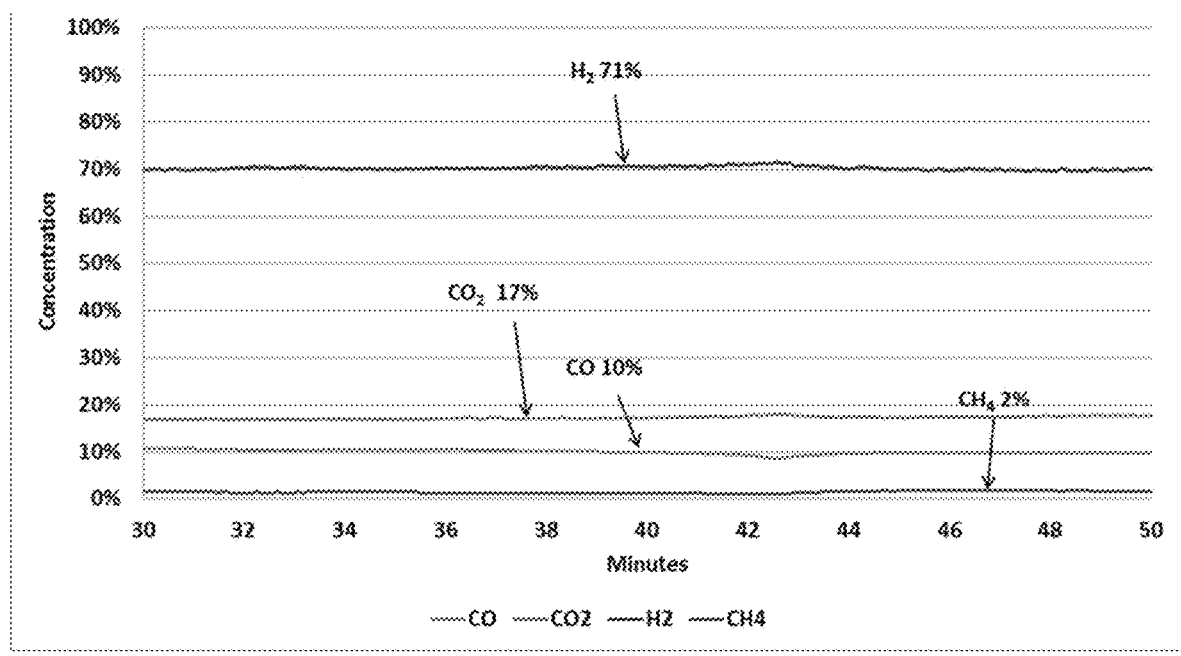
FIG. 13. Gas composition when steam reforming "heavy" VTB at 865° C., 50 psig, S/C=5, 75 wt % Ni catalyst/25 wt % α $Al_2O_3$.

FIG. 13 is a gas chromatogram for the "heavy" VTB. This material was a solid at room temperature and must be heated to almost 300° F. to melt. This temperature is too high to be used in the laboratory liquid feed system (an ISCO syringe pump) so it was diluted with 20 weight percent xylene (which still required heating to be pumped). The heavy VTB is much more tar-like than the medium VTB and has very little in the way of kerosine through gas oil hydrocarbons when analyzed by GC. Heavier components are present to a larger extent than in the medium VTB. The offset is where the background (column bleed) rose to very high levels. FIG. 13 shows the results for reforming and regeneration at T=865° C. (1589° F.), P=50 psig, Steam/carbon=5. The product of WHSV and time was from 0.01-0.25 (with time=90 to 120 minutes and 500 g of solids). As before $H_2$=~70 vol % and there was no evidence of catalyst deactivation. Because the ExxonMobil VTB is not completely fluid until T=150° C., and since we could not flow at this high of a temperature (limited by the high pressure syringe pump), 20% mixed isomer xylenes were added to make the VTB fluid at room temperature. A carbon mass balance (~90%) indicated that we were not simply reforming the xylene but were in fact reforming ExxonMobil VTB. The fact that the hydrogen yield is always around 70% is consistent with their elemental analyses all containing about the same amount of carbon.

FIG. 13 shows the results of 34 steam reforming-regeneration cycles (66 hours, or 107 minutes per cycle with a WHSV*time=about 0.1) with the heavy VTB. No deactivation of the Ni catalyst was observed over the course of the run, and as before, the hydrogen concentration was about 70 volume %.

Figure 14:
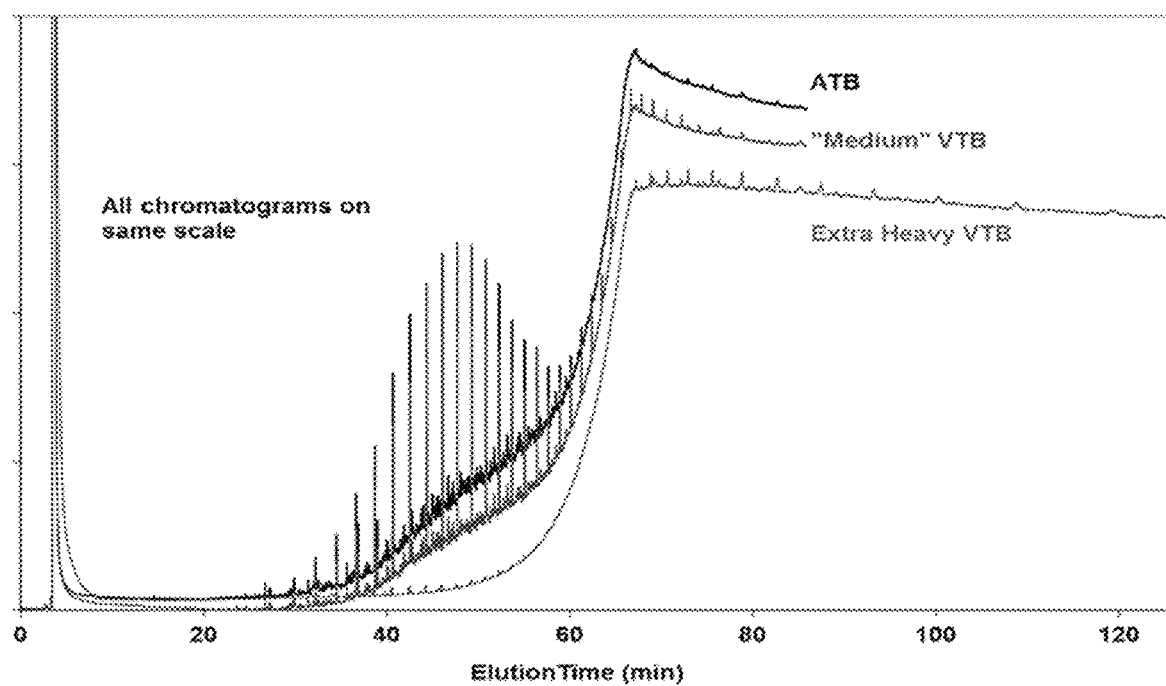
FIG. 14. Comparison of GC for ATB and the two VTB samples.

FIG. 14 is a comparison of the gas chromatograms for all three feeds that were used in Examples 3-5 in the heavy oil reforming process. All three chromatograms are shown on the same scale. The ATB (black) has a considerable amount of dissolved hydrocarbons in the middle distillate boiling range and only a small amount of higher molecular weight components. In FIG. 14, the peak height of each component is roughly proportional to its concentration in a given sample. Thus, the medium VTB (pink) has almost as high a concentration of middle distillate hydrocarbons as the ATB, but the heavy VTB sample (blue) contains practically none. While these results are far from quantitative, they are useful for comparison purposes and show that the heavy VTB contains only very high molecular weight hydrocarbons, and therefore, the high conversion we observe when steam reforming heavy VTB is not simply due to reforming lighter components of the feed, because there are none. In addition, the conversions we measure are too high to be a result of just reforming the 20% xylene diluent added to make the VTB fluid.

Example 6: Steam Reforming of Diluted Bitumen

Figure 15:
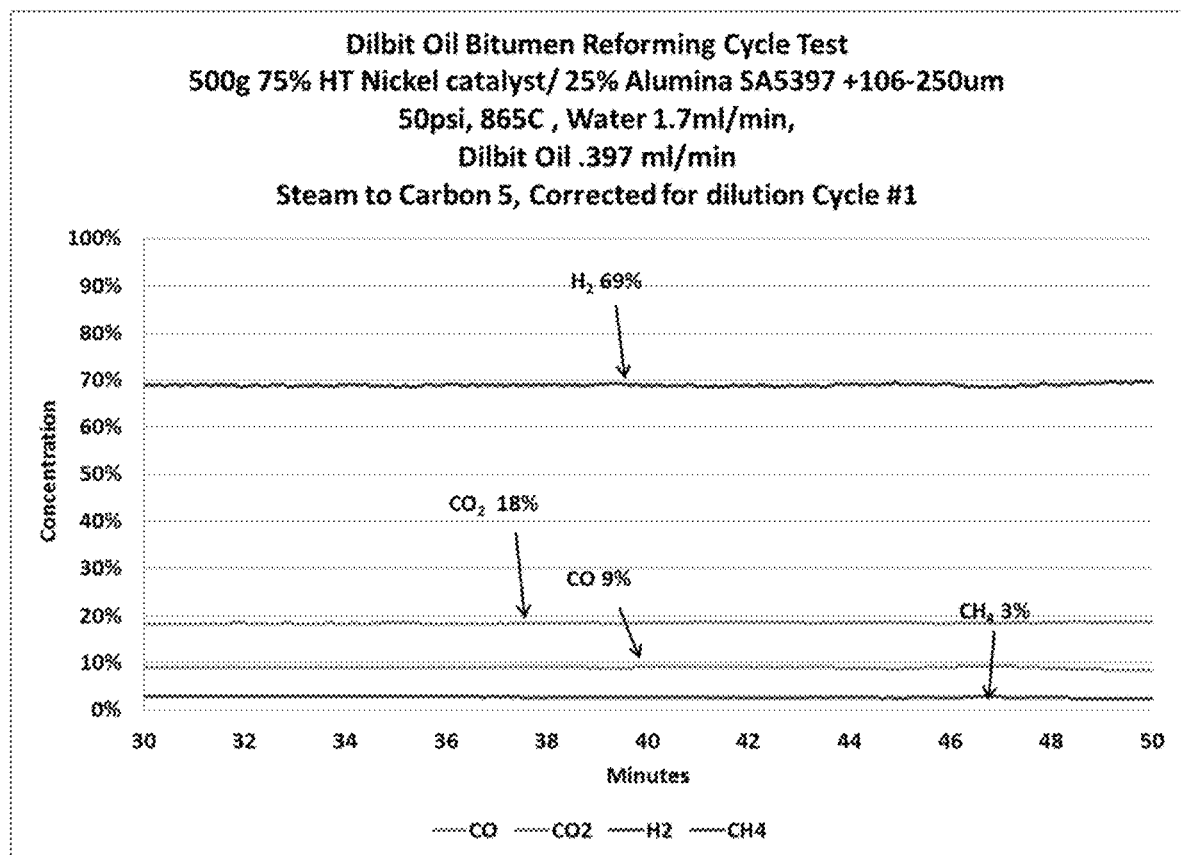
FIG. 15. Gas composition when steam reforming DilBit at 865° C., 50 psig, S/C=5, 75 wt % Ni catalyst/25 wt % α $Al_2O_3$.

One of the products of bitumen recovery using steam assisted gravity drainage (SAGD) is so-called "DilBit," which is short for diluted bitumen. In this case the raw bitumen has been diluted with 30 wt % condensate (light hydrocarbons) that is co-produced in the SAGD process. The DilBit sample was obtained from a Canadian oil sands producer. FIG. 15 shows the result of steam reforming DilBit under the same conditions as the heavy VTB (FIG. 15). As before, the syngas contains about 70 vol % hydrogen (dry basis) and there was no evidence of deactivation over the course of 55 cycles (WHSV*time=0.10. This indicates that the technology of this invention can be used to generate hydrogen during oil sand bitumen recovery Example 7: Steam Reforming Fast Biomass Pyrolysis Oil Biomass can be converted into an aromatic oil by very rapid heating in the absence of air in a process referred to as fast pyrolysis. The advantage of using fast pyrolysis is that it converts biomass from a low density, moisture laden material into a high energy density, easily transported liquid. The technology of this invention can be used to convert biomass fast pyrolysis oil into hydrogen.

One strategies for biomass conversion into fuels is described by Wright and coworkers (Wright et al. 2008), where a number of portable, distributed, biomass pyrolysis units are used to generate pyrolysis oil, which is then collected and then shipped via truck or rail to a central fuel processing plant where the pyrolysis oil is converted into syngas for fuel synthesis via Fischer-Tropsch, other catalytic processes or hydrogen generation (Wright et al. 2008). Using this approach it has been estimate that Fischer-Tropsch liquids can be produced at a cost of about $1.43 per gallon of gasoline equivalent (i.e. same heating value). FIG.

Figure 16:
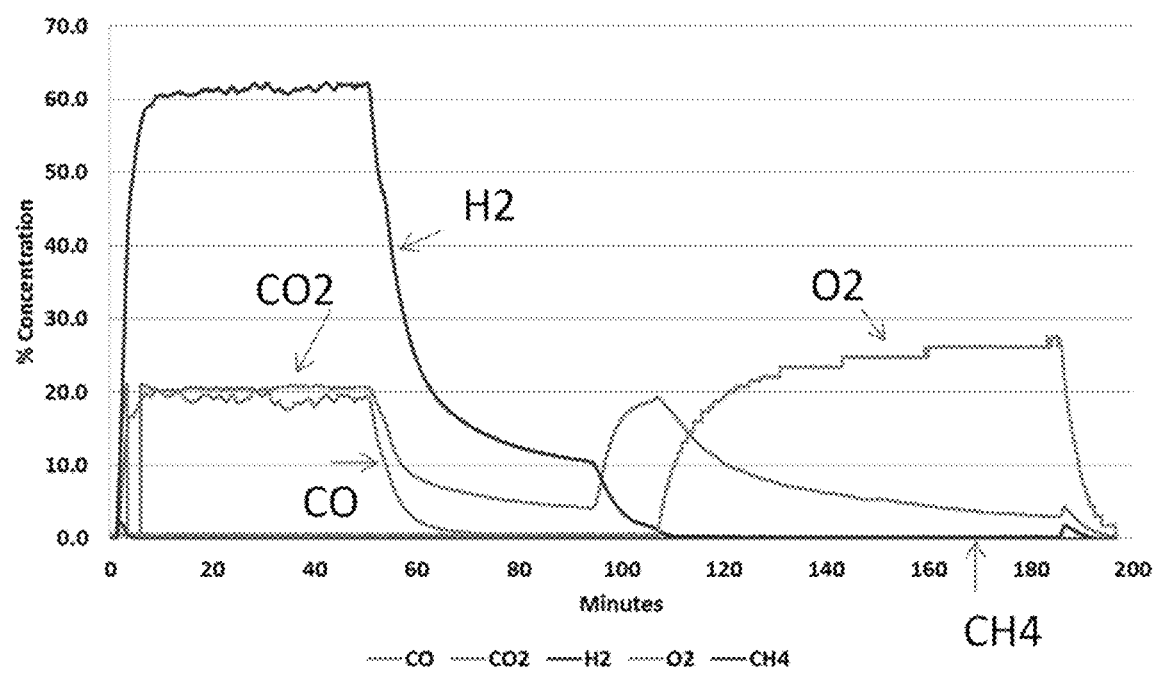
FIG. 16. Gas composition when steam reforming pyrolysis oil at 865° C., 50 psig, S/C=1, 75 wt % Ni catalyst/25 wt % α $Al_2O_3$.
Figure 22:
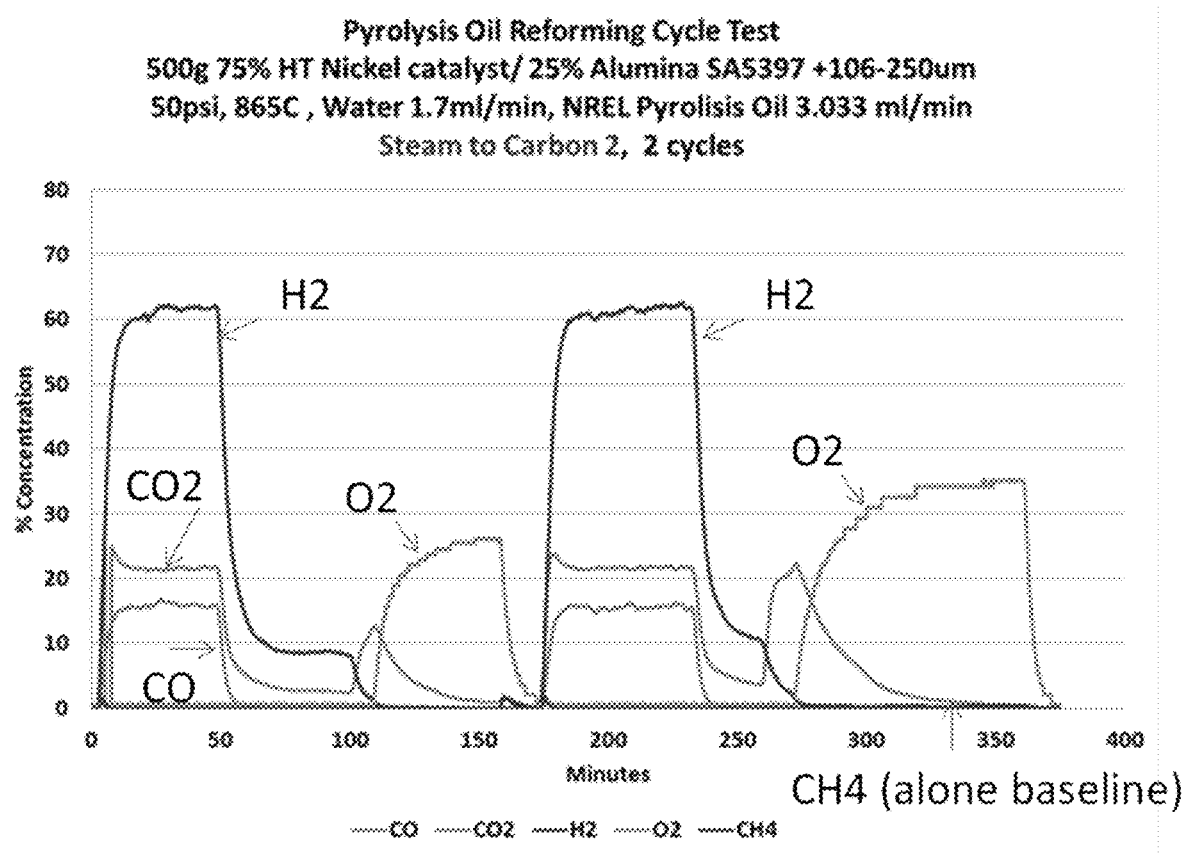
FIG. 22. HyRes processing biomass fast pyrolysis oil with a steam to carbon ratio of 2.
Figure 23:
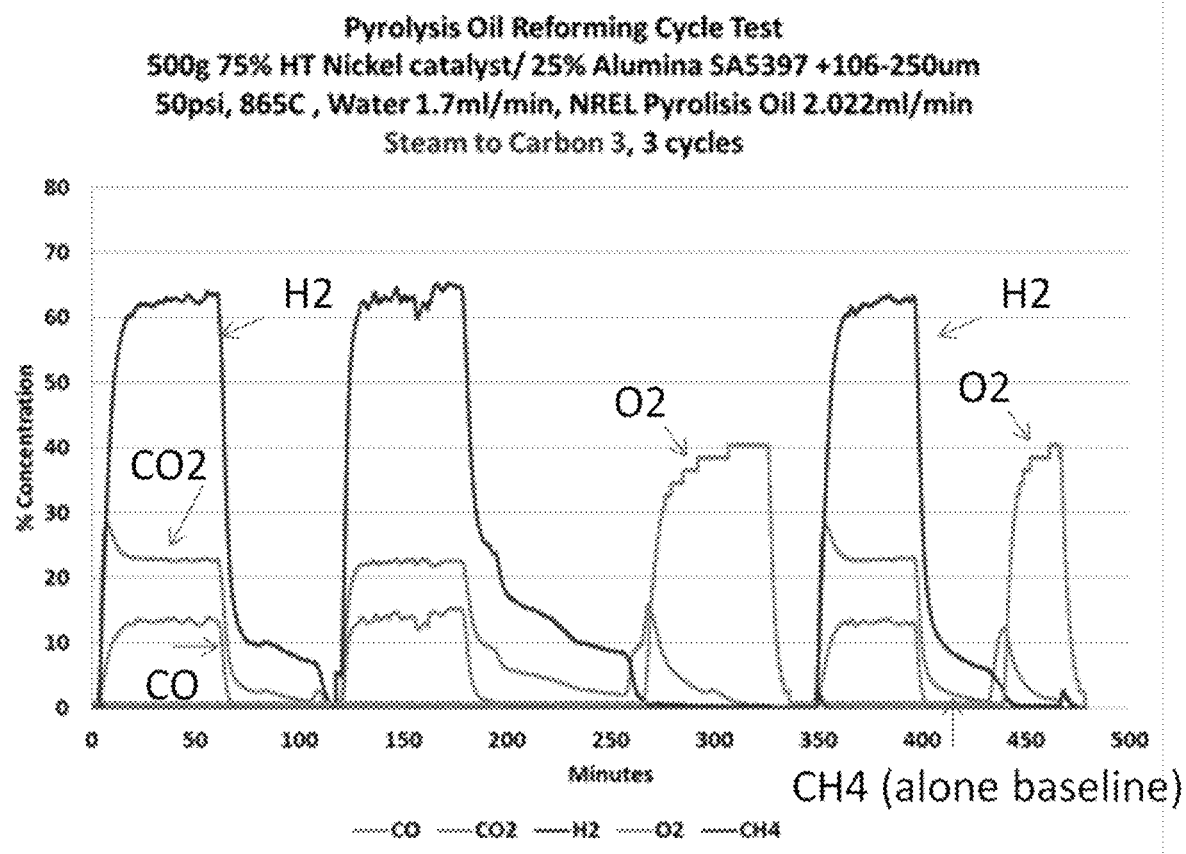
FIG. 23. HyRes processing biomass fast pyrolysis oil with a steam to carbon ratio of 3.
Figure 24:
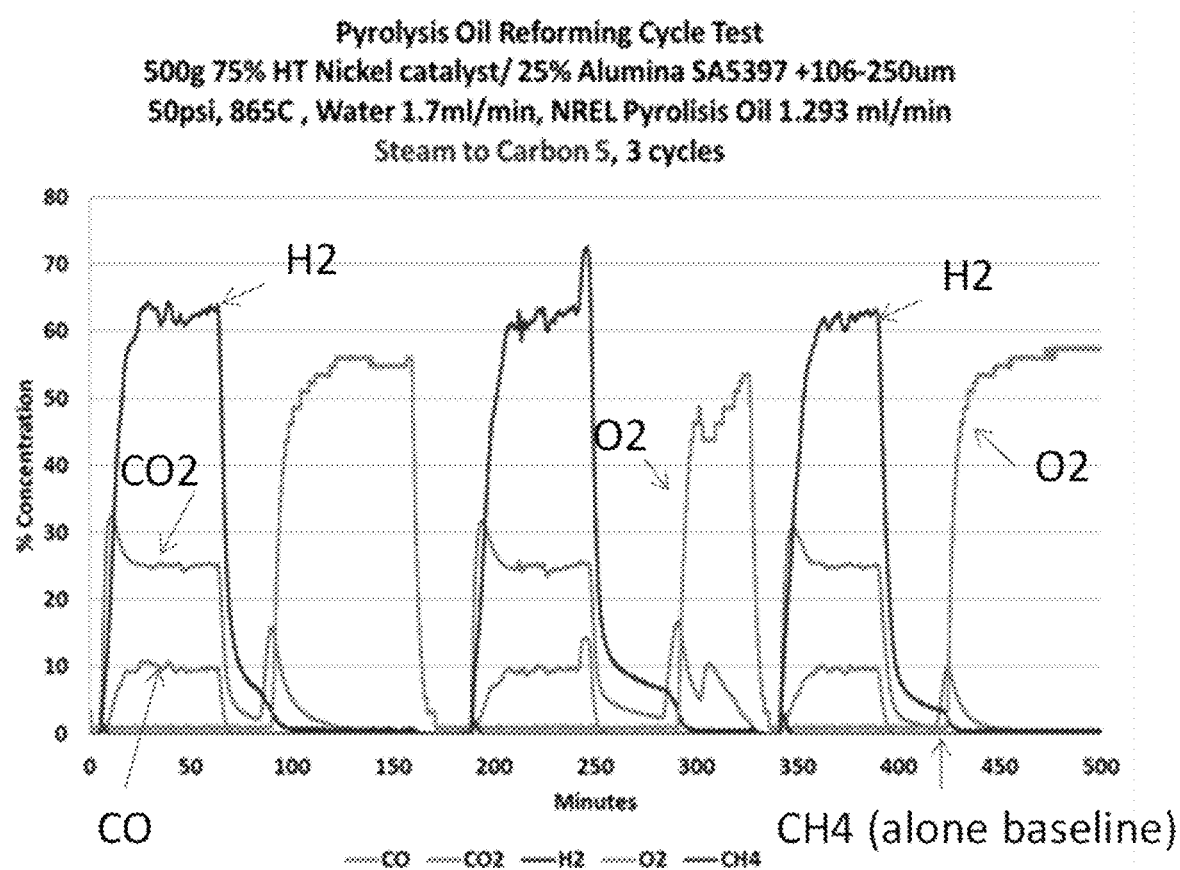
FIG. 24. HyRes processing biomass fast pyrolysis oil with a steam to carbon ratio of 5.
Figure 25:
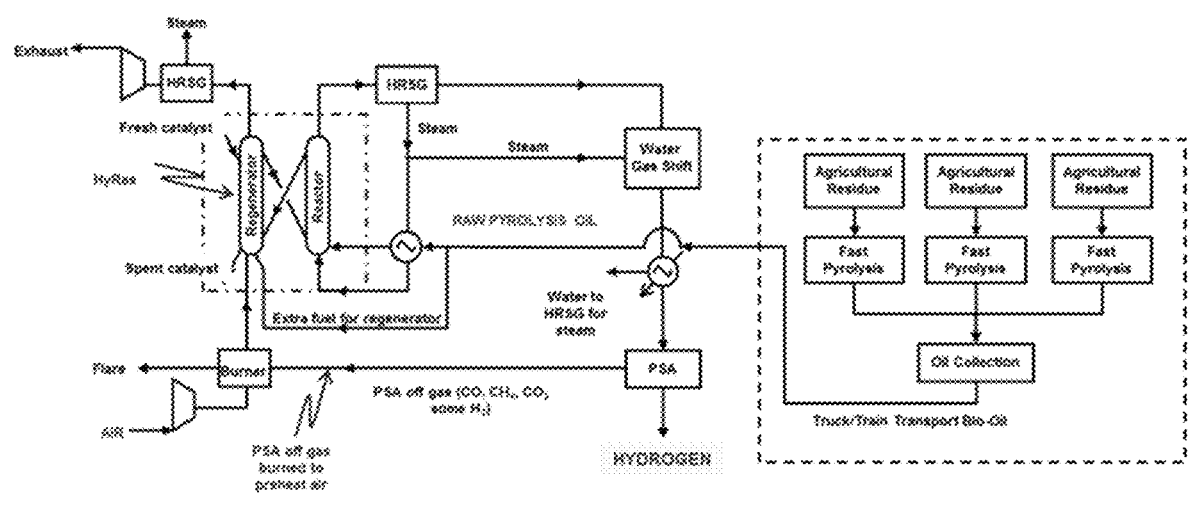
FIG. 25. Renewable hydrogen from HyRes combined with distributed biomass fast pyrolysis oil plants, centralized oil collection and transport to the HyRes plant.
Figure 26:
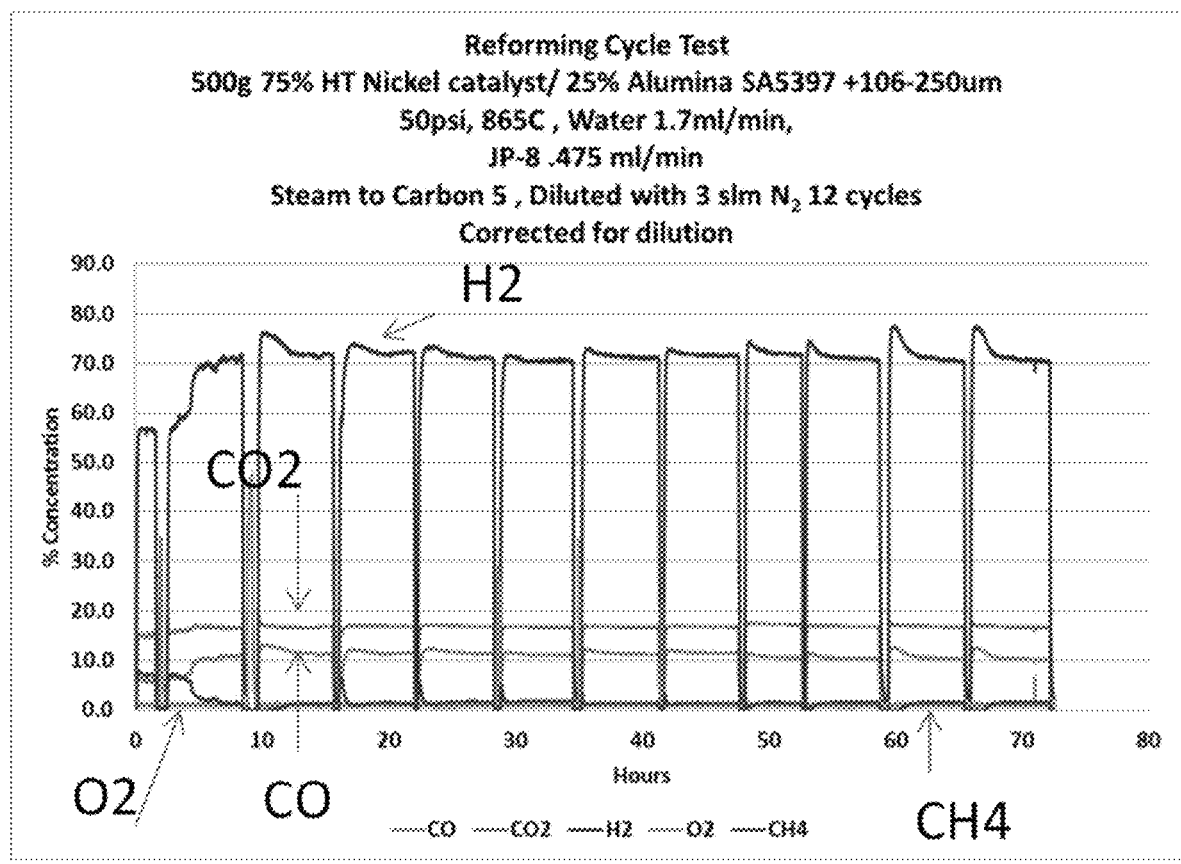
FIG. 26. Hydrogen production from JP-8 using HyRes.

21 shows how the HyRes process could be used to generate H$_2$ from biomass fast pyrolysis oil, and FIG. 16 is an example of a single reforming/regeneration cycle for a steam to carbon ratio of S/C=1, T=865° C. and P=50 psig. FIG. 22, FIG. 23 and FIG. 24 show HyRes processing of bio-oil for various numbers of cycles and S/C ratios (2, 3 and 5, respectively). The various product of the WHSV and time range include 1.23, 0.343, 0.410, and 0.262. Finally, FIG. 25 is a schematic that integrates the distributed pyrolysis concept of Wright et al 2008, with the HyRes process.

FIG. 16 shows the results of steam reforming biomass fast pyrolysis oil. The oil was generated from oak. The figure shows only one of several cycles of reforming followed by catalyst regeneration. Important, the feedstock is whole, unprocessed oil. Biomass fast pyrolysis oil contains significant oxygenated organic molecules and is in general much more reactive than atmospheric or vacuum residuum from petroleum refining, which permits operation at very low steam to carbon ratios. The steam to carbon ratio for the experiment shown in FIG. 16 was unity (S/C=1).

Example 8. Steam Reforming C11-C12 Paraffinic Hydrocarbons (Alkanes)

The technology of this invention can also be used as an alternative to fixed bed reforming of petroleum naphtha used to generate hydrogen. Conventional fixed bed naphtha steam reforming normally requires the use of special alkali promoted catalysts and high steam to carbon ratios to prevent coke from fouling the catalyst (Twigg 1991).

Norpar 12 is an ExxonMobil product that contains 50% C$_{11}$H$_{24}$ and 50% C$_{12}$H$_{26}$ and because of the large amount of hydrogen in the feedstock, it is possible to process Norpar 12 with HyRes at much lower steam/carbon (S/C) ratios. The results for steam reforming Norpar 12 at a S/C of 3.52, 865° C., 50 psi, 500 g solids (75% nickel catalyst and 25% alumina), Norpar 12 flowrate of 0.687 mL/min and water of 1.6 mL/min, WHSV=0.123 hr$^{-1}$, cycle time=90 to 120 minutes, and the product of WHSV*time=0.1845 to 0.246, indicate the H$_2$ yield is a little larger than what was observed with the heavier feeds, but still around 70 vol %.

Figure 17:
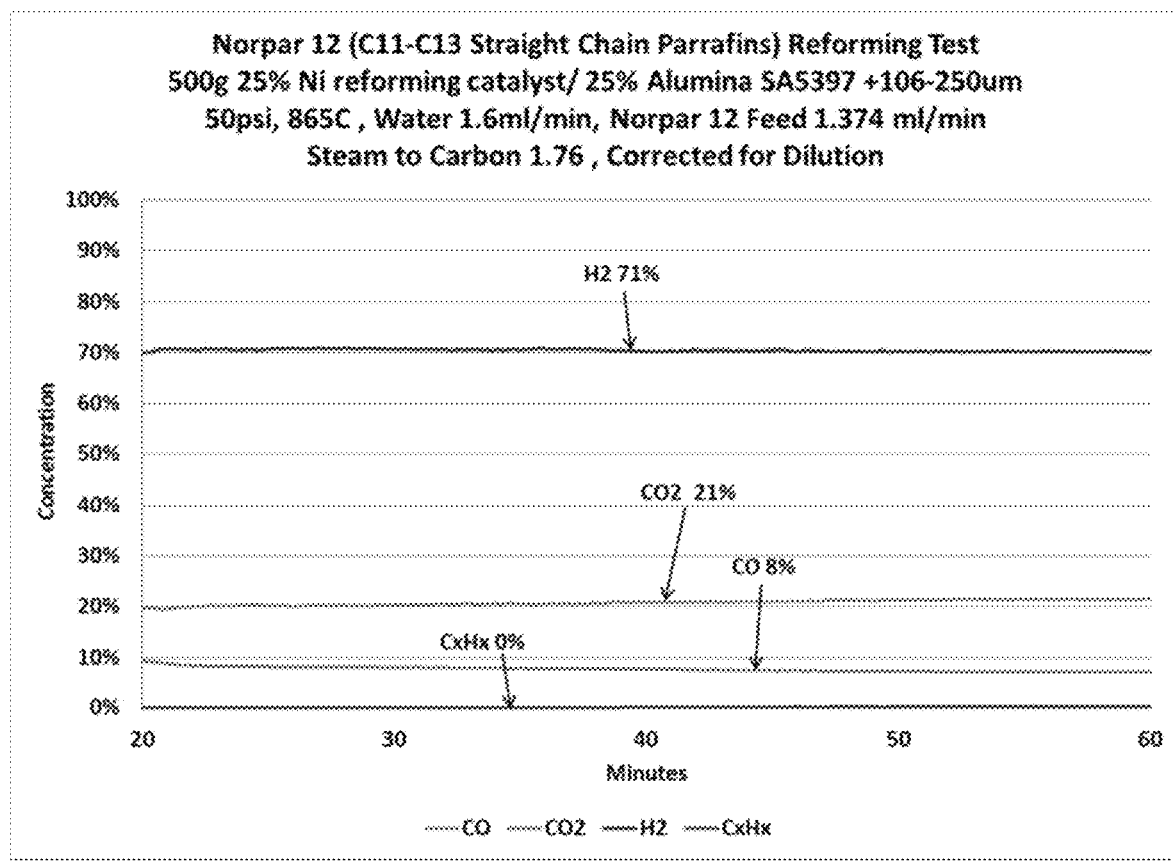
FIG. 17. Gas composition when steam reforming Norpar 12 at 865° C., 50 psig, S/C=1.76, 75 wt % Ni catalyst/25 wt % α $Al_2O_3$.

FIG. 17 shows that the S/C ratio can be lowered even further to S/C=1.76. This is unexpectedly low for steam reforming, even when using a methane feedstock, with fixed bed reformers and the reason this is possible is that the process burns off any coke (and sulfur) that deposit on the catalyst during the regeneration step.

FIG. 17 shows the results for steam reforming NorPar 12. NorPar 12 is a commercial product of ExxonMobil that contains approximately 50% C11 and 50% C12 alkanes that was used in the laboratory to simulate steam reforming heavy naphtha in the refinery. The experiment was run for a short time to determine the gas composition, which was essentially identical to the gas compositions produced when reforming ATB, VTB and other hydrocarbon feedstocks, and is essentially identical with the dry gas composition predicted from thermodynamic equilibrium calculations done using HSC Chemistry form Windows version 6.1. This experiment demonstrates that the technology of this invention can also be used to generate hydrogen from petroleum derived naphtha and can be used as an alternative to conventional fixed bed naphtha steam reforming.

Example 9: Hydrogen from JP-8 for Fuel Cells

The single fuel for the U.S. military is JP-8, a military grade jet fuel sometimes referred to as logistics fuel and for fuel cells, hydrogen is required. 26 shows the results for processing JP-8 with HyRes at a S/C=5, T=865° C. and 50 psig and again there was no evidence of irreversible catalyst deactivation. This was a quick test to see if HyRes was suitable for generating H$_2$ for fuel cells from JP-8, and as a result only 12 cycles were run. The basic idea was that because JP-8 can contain as much as 150 ppm sulfur which must be removed. HyRes removes sulfur because the Ni steam reforming catalyst behaves as a scavenger during reforming. The nickel sulfide is subsequently decomposed to NiO and SOx during regeneration. Thus, HyRes is unique in that it simultaneously generates syngas and removes sulfur. Our testing has shown that we can remove sulfur down to levels <5 ppm, a concentration that can be easily removed using expendable sorbents. The success of HyRes in processing both Norpar 12 and JP-8 shows that HyRes is a violable alternative to fixed bed steam naphtha reforming. Steam naphtha reforming is used to generate hydrogen in Europe because most of the countries mostly use diesel fuel for transportation, have shortages of natural gas, and thus can use the naphthas produced in the refinery to make hydrogen.

Example 10: Canadian Oil Sand Bitumen

Canadian oil sands (bitumen) are an important unconventional petroleum resource. Normally, bitumen is coked to produce a synthetic crude oil (missing the 1000+° F. fraction which turned into coke) that is then pipelined to the refinery (Probstein and Hicks 1982). The syncrude is then blended with conventional oil so that the atmospheric and vacuum distillation equipment can function properly. One alternative or adjunct to coking to produce syncrude from bitumen would be to use some of the raw bitumen or DILBIT to make hydrogen for upgrading bitumen to syncrude to reduce the amount of coking required. Hydrogen could also be used to stabilize the syncrude by saturating olefins produced by coking. We obtained three samples of bitumen from Sunoco that were classified as follows: 1) DILBIT (Bitumen+30% condensate), 2) Sales Oil (Bitumen+15% condensate) and finally 3) Emulsion (Bitumen/water). We were able to test both DILBIT and Sales Oil but not Emulsion since it was heterogeneous with lumps of insoluble bitumen in water (basically tar balls). FIG. 15 shows the results for processing DILBIT with HyRes. DILBIT is bitumen diluted with 30% condensate. Condensate is lighter liquid hydrocarbons that are produced along with bitumen using Steam Assisted Gravity Drainage (SAGD) since some in-situ steam distillation of the material underground naturally occurs. DILBIT is liquid at room temperature and was easy to feed to the HyRes reactor. The performance of HyRes with DILBIT was essentially identical to that obtained with refinery residuum ATB and VTB (i.e. 70 vol % H$_2$ in raw syngas and no catalyst deactivation).

In the above examples 3-10, a reason that the Ni steam reforming catalyst does not deactivate in the process is that cycling between reforming and regeneration removes coke and sulfur from the catalyst before it can build up to damaging levels. As mentioned earlier, hydrocarbons are steam reformed to syngas in the reformer vessel, and coke and sulfur that deposit on the catalyst are burned off in the regenerator while is oxidized to NiO. Catalyst from the regenerator (now NiO) is then reduced back to catalytically active Ni metal by the hydrocarbon feed when it returns to the reformer. In this sense, not only is the Ni a steam reforming catalyst, but it is also an oxygen transfer material. In a continuous system, balancing the circulation rate between the reformer and regenerator along with appropriate rates of heavy oil, steam, and air the system can produce syngas continuously using a Ni catalyst. This is in contrast to a fixed bed reformer, where unless oxygen is added (i.e. PDX) the Ni catalyst will be rapidly coked.

The fate of sulfur in the feedstock: Since ATB and VTB contains all of the bottom of the barrel compounds found in crude oil these heavy feedstocks also contain most of the sulfur (~1-2 wt %), and since no long term catalyst deactivation was observed, the sulfur is not staying on the catalyst. Part of this sulfur tolerance is due to the high temperature (865° C.) used in the experiments, and the fact that there is hydrogen in the gas. Both of these help shift the equilibrium toward $H_2S+Ni$ rather than NiS. However, some nickel sulfide form during reforming and this is the reason that sulfur eventually deactivates the catalyst in fixed bed steam reformers. In the case of the present invention, as long as nickel sulfide does not build up so fast that regeneration cannot keep up, it will be burned off in the regeneration cycle giving $SO_2$ while oxidizing the catalyst to NiO. Nickel oxide is catalytically inactive for steam reforming, but when reforming starts again, NiO reacts with the hydrocarbons in the feed and is reduced back to catalytically active metallic Ni.

At high temperatures, the high concentration of hydrogen in the product gas prevents significant amounts of nickel sulfide from forming on the catalyst, as determine by the calculated equilibrium gas composition. For this calculation, the starting concentrations of reactants were chosen to be 1 mole Ni, 0.5 mole $H_2S$ and 100 mole $H_2$. When performing thermodynamic calculations for normal catalytic applications (such as a fixed bed catalyst that is not periodically regenerated), the calculations are done using much larger concentration of contaminant than catalyst (e.g. 100:1) to simulate the effect of the catalyst being exposed to low concentrations of contaminant for long periods of time. HyRes is different in that in an industrial unit that uses circulating fluidized bed reactor and regenerator, the catalyst is being continuously regenerated.

In the case of the heavy oil gasification/steam reforming experiments in the lab, we have more catalyst than sulfur (Ni/S>4) because of the relatively low concentration of sulfur in the feed compared to the weight of Ni in the catalyst. For example, for a flow rate of 0.15 mL/min of ATB that contains 0.8 wt % S, the rate of sulfur addition is 0.001 g/min. In one hour of steam reforming), 0.08 g of sulfur (0.0025 gmole) has been fed to the reactor. At the same time there are 125 grams of R-67-7H catalyst in the reactor and this catalyst contains about 12 wt % Ni, which corresponds to 15 grams of Ni (0.266 gmole). If the effectiveness factor of the catalyst is assumed to be 5% (typical for a steam reforming catalyst—Twigg 1996) there is about 0.012 gmole of Ni present at the surface. Therefore, there is about 4.5 times as much Ni present at the surface of the catalyst as there is sulfur in the feed over the course of the one hour gasification/steam reforming step. While one sulfur atom could theoretically poison more than one Ni atom (depending on the atomic structure of the catalytically active Ni sites), the unexpected lack of deactivation observed in our experiments indicates that there is not enough sulfur to poison all of the Ni, and that it does not build up because we periodically burn it off during regeneration (we observe $SO_2$ in the regenerator vent gas).

While there are almost 15 grams of Ni in the catalyst in the reactor, at 865° C., most of the nickel is present as large metal crystallites (due to sintering) and only a fraction of the Ni is exposed at the surface to participate in catalysis. This fraction is referred to as the effectiveness factor, which if calculated from experimental data is the rate of reaction measured compared to the rate that would be expected if every Ni atom were able to participate. Steam reforming catalysts operate at temperatures around 750-800° C., and at these temperatures typical effectiveness factors for commercial Ni steam reforming catalysts are on the order of 5-10% (this is the reason that Ni is preferred for steam reforming instead of the more active but extremely expensive Pt).

The present invention provides a process that allows hydrogen to be produced in refineries at a cost that is considerably lower than hydrogen produced from conventional technologies or purchasing hydrogen from a third party. This technology converts "bottom of the barrel" residuum into hydrogen and is called HyRes. In the HyRes process, residuum is steam reformed over nickel based catalysts mixed with a solid diluent to produce hydrogen without catalyst deactivation and without the need for an oxygen plant, which greatly expands the range of feedstocks that can be used to generate hydrogen. The process steam reforms residuum over nickel based catalysts without catalyst deactivation because the system uses a fluidized bed with periodic catalyst regeneration with air. Residuum and steam are fed into a fluidized bed reactor containing Ni steam reforming catalyst at 865° C. to generate syngas ($CO+H_2$). Because the process uses contact times on the order of minutes, not enough carbon (or sulfur) can build up on the catalyst to cause irreversible deactivation. The catalyst is then regenerated by burning off the coke and sulfur with air. In the laboratory, this is done using a single reactor with a nitrogen purge between reforming and regeneration steps; however, a preferred process has a circulating fluidized bed system. Burning off the coke in the regenerator reheats the catalyst to about 900° C. for the next reforming step (a small amount of residuum, heavy oil or other fuel can be added to the regenerator to increase the temperature if there is not enough coke to reheat the catalyst to 865° C.). The hot nickel catalyst returning to the reforming reactor is present as NiO but is quickly reduced back into active nickel metal by the hydrocarbons in the feed.

The HyRes process has been reduced to practice using atmospheric tower bottoms (ATB), two types of vacuum tower bottoms (VTB), Norpar 12 (a kerosine like solvent), JP-8 aviation turbine fuel and biomass fast pyrolysis oil and condensate diluted oil sand bitumen operating with steam to carbon ratios of S/C from 1 to 5 (depending on the feed) for hundreds of hours without any catalyst deactivation.

Figure 27:
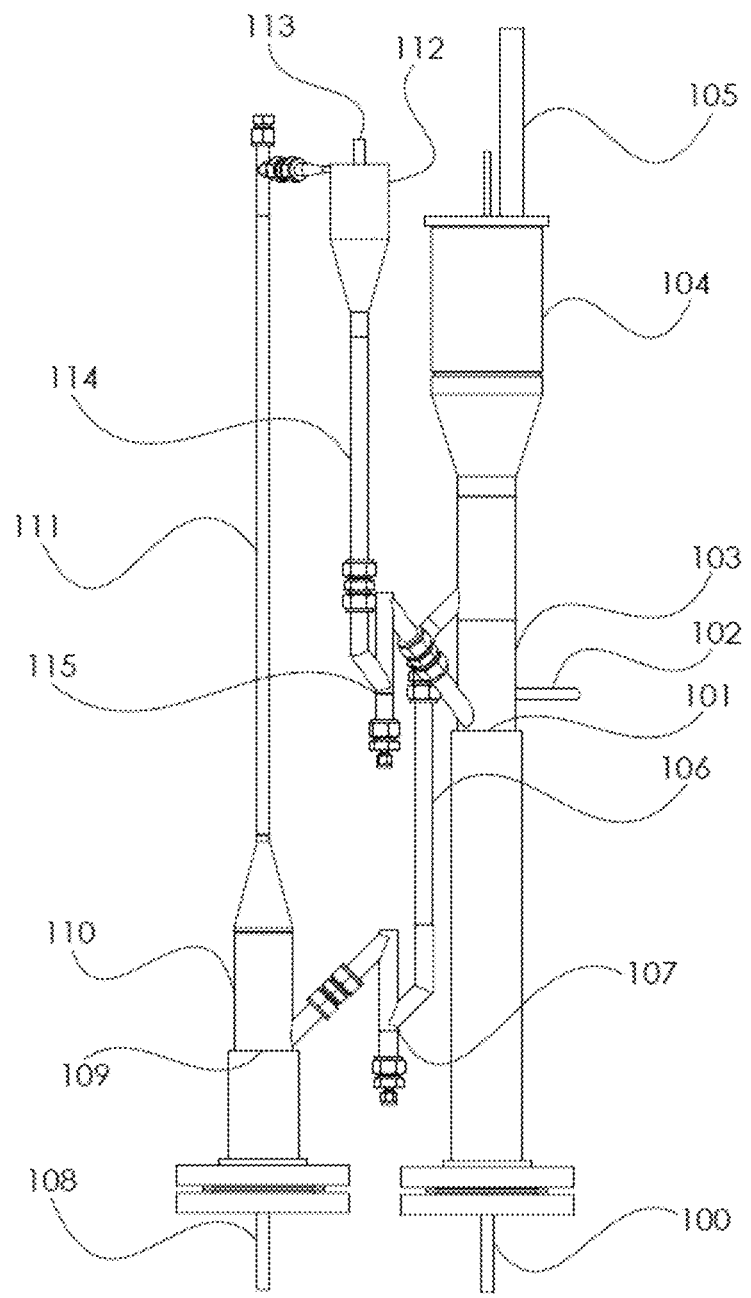
FIG. 27. Improved HyRes Process hardware diagram.

In a preferred embodiment of the invention the method used a system illustrated in FIG. 27. A steam reforming fluidized bed reactor 103 is operably connected to a steam inlet 100 to the reformer reactor, a sintered metal disc 101 (or equivalent porous device) for gas distribution in the reformer reactor and a heavy oil injector 102. The steam reforming fluidized bed reactor 103 is further attached to a disengagement zone 104 above the steam reforming fluidized bed with a product synthesis gas outlet 105 where high synthesis gas with a concentration or purity of hydrogen exits the reactor. A standpipe 106 carries used catalyst from the reformer reactor to the catalyst regeneration fluidized bed reactor 110. The standpipe 106 is operably connected to a loop seal 107, which can alternatively be preplaced with a slide valve at the same location. The regeneration reactor has an air inlet 108 a sintered metal disc 109 or other porous devices with the same function. The catalyst regeneration fluidized bed reactor regeneration fluidized bed reactor 110 is operably connected to a riser 111 for dilute phase pneumatic transport of regenerated catalyst and the riser empties into a cyclonic separator 112. Spent regeneration gas leaves via spent regeneration gas outlet 113. The regeneratied catalyst from the cyclonic separator enters standpipe 114 for solid catalyst returning to the reforming reactor. Standpipe 114 is operably connected to loop seal 115, which can alternatively be replaced with a slide valve.

The reforming and catalyst regenerator reactors form the heart of the HyRes process that generates syngas with high purity hydrogen from a heavy oil feedstock. Steam and heavy oil feedstocks are fed into a fluidized bed reactor that produces syngas (H2, CO, CO2 and a small amount of methane) with a nickel-containing steam reforming catalyst. Reforming takes place at temperatures of 850-950° C. Although carbon deposition rapidly can deactivate steam reforming catalysts when used in fixed beds, especially when reforming feedstocks that contain high molecular weight hydrocarbons, the method of the present invention avoids this. Catalyst deactivation is avoided by burning off the deactivating depositions before damaging quantities can accumulate and before the fouling becomes irreversible. The catalyst is physically transported (via fluidization) from the reforming reactor into a separate regenerator reactor where the coke and other depositions are burned off in air. The oxidation of the coke, sulfur, and nickel in the catalyst heats the solid catalyst. The hot solid catalyst particles are then returned to the reformer via riser, cyclone, standpipe, and loop seal. The heat necessary for the steam reforming reaction is supplied by the sensible heat carried by the hot, circulating, solid catalyst.

In further detail, steam enters the reactor system at the bottom of the steam reforming reactor. This steam feedstock is fed through a gas distributor which distributes the steam evenly over the bottom of the reactor. The distributor is designed specifically so that it minimizes catalyst particle attrition and maximizes fluidization properties like homogeneous mixing of the fluidized bed. Distributors can be fabricated from sintered metal discs, bubble caps, perforated plates, spargers, pipe grids, and the like. The gas rises through the solid particle bed to lift and fluidize the solid catalyst particles. The steam reforming reactor should be operated such that the gas velocity is between 1.5 and 20 times the minimum fluidization velocity. Heavy oil is also fed into the fluidized bed by liquid injection into the side of the bed. At reactor temperatures of 850 to 950° C., these heavy oils become vaporized and mix with the steam already in the fluidized bed. The height and diameter of this steam reforming fluidized bed is optimized so that adequate mixing of the feed gases and solid catalyst can occur. The inner diameter of a fluidized bed should be a minimum of 2 inches. Steam reforming of the heavy oil feedstock occurs in the presence of the nickel-containing catalyst particles, which reduces the heavy oils to the product synthesis gas stream (syngas). This product syngas contains about 70% $H_2$ on a dry basis and also consists of CO, $CO_2$, and other light hydrocarbon vapors. As the gas exits the top of the fluidized bed, the reactor diameter increased in order to decrease the gas linear velocity At the top of the steam reforming fluidized bed, solids exit the steam reforming reactor and enter the lower standpipe. The solid catalyst particles transport down the lower standpipe in a moving packed bed regime and are delivered to the lower loop seal. At the bottom of the lower standpipe is the lower loop seal. The lower loop seal consists of an angled solids entry section, a vertical aerated upleg, and an angled solids exit section. The vertically aerated upleg is fluidized by flowing gas through a distributor at the bottom of the upleg. The loop seal can be aerated with steam or inert gas. The solids flow due to the bed density differences in the upleg and the standpipe. The solids in the packed bed standpipe have a higher bulk bed density than the fluidized upleg section of the loop seal. As more solids enter the upleg, they are fluidized and the top of this small fluidized bed overflows into the solids exit section. These solids are delivered to the regeneration reactor in an angled transfer line.

Similar to the steam reforming fluidized bed reactor, the fluidizing gas is fed into the reactor from the bottom and is delivered to the reactor by a gas distributor. The fluidizing gas in the regeneration reactor is air and should be operated such that the gas velocity is between 10 and 40 times the minimum fluidization velocity. The oxygen in the air burns off the carbon and sulfur depositions on the catalyst and oxidizes the nickel in the catalyst to nickel oxide. This reaction is exothermic and thus the regeneration reactor will operate at higher temperatures than the steam reforming reactor. The regeneration reactor can be run at temperatures from 850 to 1100° C.

The top of the regeneration reactor is connected to a riser which increases the linear velocity of the gas and entrains the catalyst particles in the upward flowing gas. The purpose of the riser is solely to transport the catalyst particles back to the steam reforming reactor. The height of the riser is determined by the height required to transfer the solids back to the steam reforming reactor. There is a minimum gas velocity to operate the riser, called the choking velocity. The gas velocity of the riser should be operated at 1.5 to 3 times the choking velocity to ensure steady flow of solids up the riser.

At the top of the riser, the solids are sent to a cyclonic separator which separates the catalyst particles from the spent air. The gas exits the top of the cyclone and does not mix with the steam reforming product stream. The solid catalyst particles drop out of the bottom of the cyclone and collect in the upper standpipe.

The solids move downward in the upper standpipe as a moving packed bed similar to the lower standpipe. The upper standpipe feeds the upper loop seal in the same manner as the lower loop seal. The upper loop seal transfers the regenerated catalyst back to the steam reforming reactor to complete the solids circulation loop. The upper loop seal also functions to seal off the oxygen in the cyclone from reaching the steam reforming reactor, which needs a limited supply of oxygen to produce a syngas stream with about 70% $H_2$.

Pressure Balance: For the entire solids circulation loop to function properly, the geometry of the reactors and transfer lines need to be designed so that the pressure balance is satisfied. The pressure built by the solids in each standpipe need to be enough to overcome the pressure drop required by the respective pressure dissipating sections of the reactor system. For example, the pressure building capability by the solids in the lower standpipe needs to overcome the total pressure drop produced by the lower loop seal upleg, regeneration reactor, riser, and cyclone.

Example of the preferred embodiment: A lab-scale version of this dual circulating fluidized bed reactor system was constructed, and the dimensions of the reactors and transfer lines are at the minimum possible dimensions for the system to function properly. The steam reforming reactor is fabricated from 2 inch Schedule 40 Incoloy 800H pipe and the fluidized bed inside would be approximately 12 to 15 cm tall above the distributor. The diameter of the steam reforming reactor increases above the bed to 4 inch Schedule 40 Incoloy 800H pipe, capped at the top with an outlet for the product syngas stream. The regeneration reactor is fabricated from 2 inch Schedule 40 Incoloy 800H pipe and is 12 cm tall above the distributor. On the top of the regeneration reactor is a conical reducer which connects the reactor to the riser. The riser is fabricated from ½ inch Incoloy 800H tubing and ends in a blind tee which feeds the cyclone. The cyclone dimensions are specifically designed so that the inlet gas velocity will be between 40 and 60 feet per second. The bottom of the cyclone connects to the upper standpipe and upper loop seal. All transfer lines between the two reactors in this design are fabricated from ¾ inch Incoloy 800H tubing. The four gas distributors in this small lab scale unit are fabricated from Inconel 600 sintered metal discs. The upper standpipe must be at least 12 inches tall and the lower standpipe must be at least 20 inches tall.

The entire reactor system is loaded with a total of 750 g of nickel-containing steam reforming catalyst. The particle size of the steam reforming catalyst loaded into the reactor system is 106 to 250 μm with an average particle density of 2750 kg/m3.

For steady state operation, the steam reforming reactor is fluidized with 5 L/min of steam. The regeneration reactor is fluidized with 12 L/min of dry air. The upper loop seal is fluidized with 0.7 L/min of steam and the lower loop seal is fluidized with 0.7 L/min of Nitrogen. The catalyst circulation rate is 1.1 g/s. The steam reforming reactor temperature is controlled at 850° C. and the regeneration reactor temperature is controlled at 950° C. Each of the outlet gas streams exiting the reactor system is sent to pressure control devices which control pressure at 50 psig. The steam reforming reactor is also fed with liquid heavy oil which is injected into the side of the reactor. This mass flow rate is determined by operating the steam reforming reactor with a steam-to-carbon molar ratio of 5.

The product gas stream exiting the reformer reactor (on a mol % basis) is 50% water, 35% $H_2$, 5.5% CO, 7.5% $CO_2$ 1.5% methane (with trace other hydrocarbons), and less than 1% nitrogen or oxygen. The $H_2S$ concentration is less than 100 ppm, but varies on the feedstock used.

On a dry gas basis, the product gas stream exiting the reformer reactor (on a mol % basis) is 70% $H_2$, 11% CO, 15% $CO_2$ 3% methane (with trace other hydrocarbons), and less than 1% nitrogen or oxygen. The $H_2S$ concentration is less than 100 ppm, but varies on the feedstock used.

Although the present invention has been described in considerable detail with reference to certain preferred versions thereof, other versions are possible Therefore, the spirit and scope of the appended claims should not be limited to the description of the preferred versions contained herein.

For the embodiments that recite the transition phrase "consisting essentially of", the invention is limited in scope to those steps specified and those that do not materially affect the basic and novel characteristics of the invention. The basic and novel characteristics of the invention are that while using a heavy oil feedstock to generate a synthesis gas product stream with at least 25 volume % hydrogen on a dry weight basis and at most 1 volume % nitrogen on a dry weight basis as a product of the steam reforming step, the method does not generate irreversible fouling on the fluidizable nickel-containing steam reforming catalyst at least not before the catalyst particles have passed through the reformer reactor a minimum of 50 times.

Any element in a claim that does not explicitly state "means for" performing a specified function, or "step for" performing a specific function, is not to be interpreted as a "means" or "step" clause as specified in 35 U.S.C. § 112 ¶6 or 35 U.S.C. § 112 (f).

What is claimed is:

1. A heavy oil steam reforming process to produce synthesis gas hydrogen, the process consisting essentially of:
   providing a heavy oil feedstock;
   providing a steam feedstock;
   providing a fuel feedstock;
   providing an air feedstock;
   providing at least one circulating fluidized bed reactor;
   providing a fluidizable nickel-containing reforming catalyst;
   using the fluidizable nickel-containing reforming catalyst in a reforming step in a bubbling fluidized reaction, wherein the reforming step is performed at about 865 to 900° C. and a pressure of about 50 to 100 psig;
   using the fluidizable nickel-containing reforming catalyst in a regeneration step in a bubbling fluidized reaction, wherein the regeneration step is performed at about 865 to 900° C. and at a pressure of about 50 to 100 psig;
   allowing the fluidizable nickel-containing reforming catalyst to contact the heavy oil feedstock and the steam feedstock in the reforming step, wherein the reforming step is operated under conditions such that the dimensionless product of the weight hourly space velocity (WHSV) of the heavy oil feedstock, in units of $hr^{-1}$, and time online, in units of hr, equals from 0.001 to 10;
   allowing the fluidizable nickel-containing reforming catalyst to contact the air feedstock and the fuel feedstock in the regeneration step to remove sulfur and carbon buildup;
   repeatedly cycling the fluidizable nickel-containing reforming catalyst between the reforming step and the regeneration step; and,
   generating a synthesis gas product stream with at least 25 volume % hydrogen on a dry weight basis and at most 1 volume % nitrogen on a dry weight basis.

2. The process of claim 1, further consisting essentially of: generating the synthesis gas product stream with at least 60 volume % hydrogen on a dry weight basis and at most 0.5 volume % nitrogen on a dry weight basis.

3. The process of claim 1, further consisting essentially of: operating the fluidized bed reactor with essentially no supplemental oxygen during the reforming step, other than the oxygen transported in a form of nickel-oxide and that which is contained in the heavy oil feedstock.

4. A heavy oil steam reforming process to produce synthesis gas hydrogen, the process consisting essentially of:
   providing a heavy oil feedstock;
   providing a steam feedstock;
   providing a fuel feedstock;
   providing an air feedstock;
   providing a steam reforming fluidized bed reactor;
   providing a catalyst regeneration fluidized bed reactor, wherein the catalyst regeneration fluidized bed reactor is operably connected to a dilute phase pneumatic transport riser that exits the catalyst regeneration fluidized bed reactor;
   providing a fluidizable nickel-containing steam reforming catalyst, wherein the fluidizable nickel-containing steam reforming catalyst has a nickel content of from 10-20 weight percent;
   providing a first stand pipe, connecting the steam reforming fluidized bed reactor to the catalyst regeneration fluidized bed reactor, wherein the first stand pipe has either a first loop seal or a first slide valve;
   providing a second stand pipe, connecting the catalyst regeneration fluidized bed reactor to the steam reforming fluidized bed reactor, wherein the second stand pipe has either a second loop seal or a second slide valve;

continuously transporting the fluidizable nickel-containing steam reforming catalyst from the steam reforming fluidized bed reactor to the catalyst regeneration fluidized bed reactor and back to the steam reforming fluidized bed reactor in a continuous looping process, wherein the fluidizable nickel-containing steam reforming catalyst leaving the steam reforming fluidized bed reactor transports through the first standpipe and then into the catalyst regeneration fluidized bed reactor, and wherein the fluidizable nickel-containing steam reforming catalyst leaving the catalyst regeneration fluidized bed reactor next transports through the riser and then through the second standpipe and then into the steam reforming fluidized bed reactor;

using the fluidizable nickel-containing steam reforming catalyst in a steam reforming step in a fluidized reaction, wherein the steam reforming step is performed at 850 to 950° C. and a pressure of 50 to 100 psig;

using the fluidizable nickel-containing steam reforming catalyst in a regeneration step in a fluidized reaction, wherein the regeneration step is performed at 850 to 1100° C. and at a pressure of 50 to 100 psig;

allowing the fluidizable nickel-containing steam reforming catalyst to contact the heavy oil feedstock and the steam feedstock in the steam reforming step, wherein the steam reforming step is operated under conditions such that the product of the weight hourly space velocity (WHSV) of the heavy oil feedstock and the time online equals from 0.001 to 10;

allowing the fluidizable nickel-containing reforming catalyst to contact the air feedstock and the fuel feedstock in the regeneration step to remove sulfur and carbon buildup;

not generating irreversible fouling on the fluidizable nickel-containing steam reforming catalyst while using the heavy oil feedstock to produce synthesis gas in the steam reforming fluidized bed reactor; and generating a synthesis gas product stream with at least 25 volume % hydrogen on a dry weight basis and at most 1 volume % nitrogen on a dry weight basis as a product of the steam reforming step and as a product stream directly exiting the steam reforming fluidized bed reactor.

5. The process of claim 4, further consisting essentially of: controlling solid concentration and residence time of the fluidizable nickel-containing steam reforming catalyst in the steam reforming fluidized bed reactor and the catalyst regeneration fluidized bed reactor by controlling solid flow at either the first loop seal, the second loop seal, the first slide valve or the second slide valve.

6. The process of claim 4, wherein the steam reforming step is operated under conditions such that the product of the weight hourly space velocity (WHSV) of the heavy oil feedstock and the time online equals from 0.01 to 1.64.

7. The process of claim 4, wherein the steam reforming step is operated under conditions such that the product of the weight hourly space velocity (WHSV) of the heavy oil feedstock and the time online equals from 0.01 to 0.25.

8. The process of claim 4 further consisting essentially of: providing a fluidizable mixture of the fluidizable nickel-containing steam reforming catalyst and a fluidizable solid diluent, wherein the fluidizable nickel-containing steam reforming catalyst is from 25 to 75 weight percent of the fluidizable mixture.

9. The process of claim 8, wherein the fluidizable nickel-containing steam reforming catalyst is about 75 weight percent of the fluidizable mixture.

10. The process of claim 4, wherein the fluidizable nickel-containing steam reforming catalyst has a magnesium aluminate or calcium aluminate support, and a particle size from 100 to 250 μm.

11. The process of claim 4, further consisting essentially of:
generating the synthesis gas product stream with at least 60 volume % hydrogen on a dry weight basis and at most 1 volume % nitrogen on a dry weight basis.

12. The process of claim 4, further consisting essentially of: operating the fluidized bed reactor with essentially no supplemental oxygen during the steam reforming step, other than the oxygen transported in a form of nickel-oxide and that which is contained in the steam and in the heavy oil feedstock.

13. The process of claim 4, further consisting essentially of operating the steam reforming step with a steam/carbon ratio greater than about 1.

14. The process of claim 13, further consisting essentially of operating the steam reforming step at a steam-to-carbon ratio from about 3 to about 5.

15. The process of claim 14, wherein the heavy oil is either long residuum or atmospheric residuum, vacuum residuum or petcoke.

16. The process of claim 15, further consisting essentially of:
converting the fluidizable nickel-containing reforming catalyst to a nickel-oxide form in the regeneration fluidized bed and allowing the fluidizable nickel-containing steam reforming catalyst to transport to the steam reforming fluidized bed in a continuous looping process.

17. The process of claim 4 further consisting essentially of:
operating the steam reforming fluidized bed reactor in a bubbling flow regime and operating the catalyst regenerating fluidized bed in a turbulent flow regime.

18. The process of claim 4 further consisting essentially of:
operating the steam reforming fluidized bed reactor in a turbulent flow regime and operating the catalyst regenerating fluidized bed in a turbulent flow regime.

* * * * *